(12) United States Patent
Xie et al.

(10) Patent No.: US 9,898,809 B2
(45) Date of Patent: Feb. 20, 2018

(54) SYSTEMS, METHODS AND TECHNIQUES FOR INPUTTING TEXT INTO MOBILE DEVICES USING A CAMERA-BASED KEYBOARD

(71) Applicants: Nanjing University, Nanjing (CN); College of William and Mary, Willamsburg, VA (US)

(72) Inventors: Lei Xie, Nanjing (CN); Yafeng Yin, Nanjing (CN); Qun Li, Williamsburg, VA (US); Sanglu Lu, Nanjing (CN)

(73) Assignees: NANJING UNIVERSITY, Nanjing (CN); COLLEGE OF WILLIAM AND MARY, Williamsburg, VA (US)

( * ) Notice: Subject to any disclaimer, the term of this patent is extended or adjusted under 35 U.S.C. 154(b) by 171 days.

(21) Appl. No.: 14/936,915

(22) Filed: Nov. 10, 2015

(65) Prior Publication Data
US 2017/0131760 A1 May 11, 2017

(51) Int. Cl.
*G06F 3/042* (2006.01)
*G06T 5/30* (2006.01)
(Continued)

(52) U.S. Cl.
CPC .............. *G06T 5/30* (2013.01); *G06F 3/0426* (2013.01); *G06K 9/00355* (2013.01); *G06K 9/38* (2013.01); *G06K 9/4652* (2013.01); *G06T 7/004* (2013.01); *G06T 7/0081* (2013.01); *G06T 7/0085* (2013.01); *G06T 7/408* (2013.01); *H04N 5/2257* (2013.01); *G06T 2207/10016* (2013.01); *G06T 2207/10024* (2013.01); *G06T 2207/30196* (2013.01)

(58) Field of Classification Search
None
See application file for complete search history.

(56) References Cited

U.S. PATENT DOCUMENTS

| 6,614,422 B1 * | 9/2003 | Rafii | G06F 1/1626 345/156 |
| 7,042,442 B1 * | 5/2006 | Kanevsky | G06F 3/017 345/157 |

(Continued)

OTHER PUBLICATIONS

M. Fukumoto and Y. Tonomura, "Body coupled fingerring: wireless wearable keyboard," in Proc. of ACM CHI, 1997.
(Continued)

*Primary Examiner* — Nicholas Lee
(74) *Attorney, Agent, or Firm* — Nixon & Vanderhye PC

(57) ABSTRACT

Systems, methods and techniques are provided for interacting with mobile devices using a camera-based keyboard. The system comprises a processor system including at last one processor. The processor system is configured to at least capture a plurality of images in connection with the keyboard and at least one hand typing on the keyboard via the camera. Based on the plurality of captured images, the processor system is further configured to locate the keyboard, extract at least a portion of the keys on the keyboard, extract a hand, and detect a fingertip of the extracted hand. After that, a keystroke may be detected and localized through tracking the detected fingertip in at least one of the plurality of captured images, and a character corresponding to the localized keystroke may be determined.

24 Claims, 11 Drawing Sheets

(51) Int. Cl.
| | |
|---|---|
| G06T 7/00 | (2017.01) |
| H04N 5/225 | (2006.01) |
| G06T 7/40 | (2017.01) |
| G06K 9/00 | (2006.01) |
| G06K 9/38 | (2006.01) |
| G06K 9/46 | (2006.01) |

(56) References Cited

U.S. PATENT DOCUMENTS

| | | | | |
|---|---|---|---|---|
| 2005/0134117 | A1* | 6/2005 | Ito | B60R 16/0373 307/10.1 |
| 2011/0102570 | A1* | 5/2011 | Wilf | G06F 3/017 348/77 |
| 2013/0181904 | A1* | 7/2013 | Murase | G06F 3/005 345/168 |
| 2013/0265219 | A1* | 10/2013 | Sato | G06F 3/01 345/156 |
| 2014/0152566 | A1* | 6/2014 | Safer | G06F 3/0213 345/163 |
| 2014/0375539 | A1* | 12/2014 | Gabara | G06F 3/0304 345/156 |

OTHER PUBLICATIONS

M. Kolsch and M. Turk, "Keyboards without keyboards: A survey of virtual keyboards," University of California, Santa Barbara, Tech. Rep., 2002.
K. A. Faraj, M. Mojahid, and N. Vigouroux, "Bigkey: A virtual keyboard for mobile devices," Human-Computer Interaction, vol. 5612, pp. 3-10, 2009.
S. Oney, C. Harrison, A. Ogan, and J. Wiese, "Zoomboard: A diminutive qwerty soft keyboard using iterative zooming for ultra-small devices," in Proc. of ACM CHI, 2013.
H. Du, T. Oggier, F. Lustenberger, and E. Charbon1, "A virtual keyboard based on true-3d optical ranging," in Proc. of the British Machine Vision Conference, 2005.
M. Lee and W. Woo, "Arkb: 3d vision-based augmented reality keyboard," in Proc. of ICAT, 2003.
C. Harrison, H. Benko, and A. D. Wilson, "Omnitouch: Wearable multitouch interaction everywhere," in Proc. of ACM UIST, 2011.
J. Mantyjarvi, J. Koivumaki, and P. Vuori, "Keystroke recognition for virtual keyboard," in Proc. of IEEE ICME, 2002.
H. Roeber, J. Bacus, and C. Tomasi, "Typing in thin air: The canasta projection keyboard—a new method of interaction with electronic devices," in Proc. of ACM CHI EA, 2003.
J. Wang, K. Zhao, X. Zhang, and C. Peng, "Ubiquitous keyboard for small mobile devices: Harnessing multipath fading for fine-grained keystroke localization," in Proc. of ACM MobiSys, 2014.
T. Murase, A. Moteki, N. Ozawa, N. Hara, T. Nakai, and K. Fujimoto, "Gesture keyboard requiring only one camera," in Proc. of ACM UIST, 2011.
Z. Zhang, Y. Wu, Y. Shan, and S. Shafer, "Visual panel: Virtual mouse, keyboard and 3d controller with an ordinary piece of paper," in Proc. of ACM PUI, 2001.
Y. Adajania, J. Gosalia, A. Kanade, H. Mehta, and N. Shekokar, "Virtual keyboard using shadow analysis," in Proc. of ICETET, 2010.
R. Biswas and J. Sil, "An improved canny edge detection algorithm based on type-2 fuzzy sets," Procedia Technology, vol. 4, pp. 820-824, 2012.
S. A. Naji, R. Zainuddin, and H. A. Jalab, "Skin segmentation based on multi pixel color clustering models," Digital Signal Processing, vol. 22, No. 6, pp. 933-940, 2012.
"Otsu's method," https://en.wikipedia.org/wiki/Otsu%27s method, 2015.
"Opencv library," http://opencv.org/, 2015.
"Monsoon power monitor," http://www.msoon.com/, 2015.
"Swype," http://www.swype.com/, 2015.
Y. S. Kim, B. S. Soh, and S.-G. Lee, "A New Wearable Input Device: Scurry," IEEE Transactions on Industrial Electronics, vol. 52, No. 6, pp. 1490-1499, Dec. 2005.
V. R. Pratt, "Thumbcode: A device-independent digital sign language," in http://boole.stanford.edu/thumbcode/, 1998.
M. Goldstein and D. Chincholle, "The finger-joint gesture wearable keypad," in Second Workshop on Human Computer Interaction with Mobile Devices, 1999.
M. Goel, A. Jansen, T. Mandel, S. Patel, and J. Wobbrock, "Context-type: Using hand posture information to improve mobile touch screen text entry," in Proc. of ACM CHI, 2013.
O. Schoenleben and A. Oulasvirta, "Sandwich keyboard: Fast ten-finger typing on a mobile device with adaptive touch sensing on the back side," in Proc. of ACM MobileHCI, 2013, pp. 175-178.
"Iphone app: Paper keyboard," http://augmentedappstudio.com/support.html, 2015.

* cited by examiner

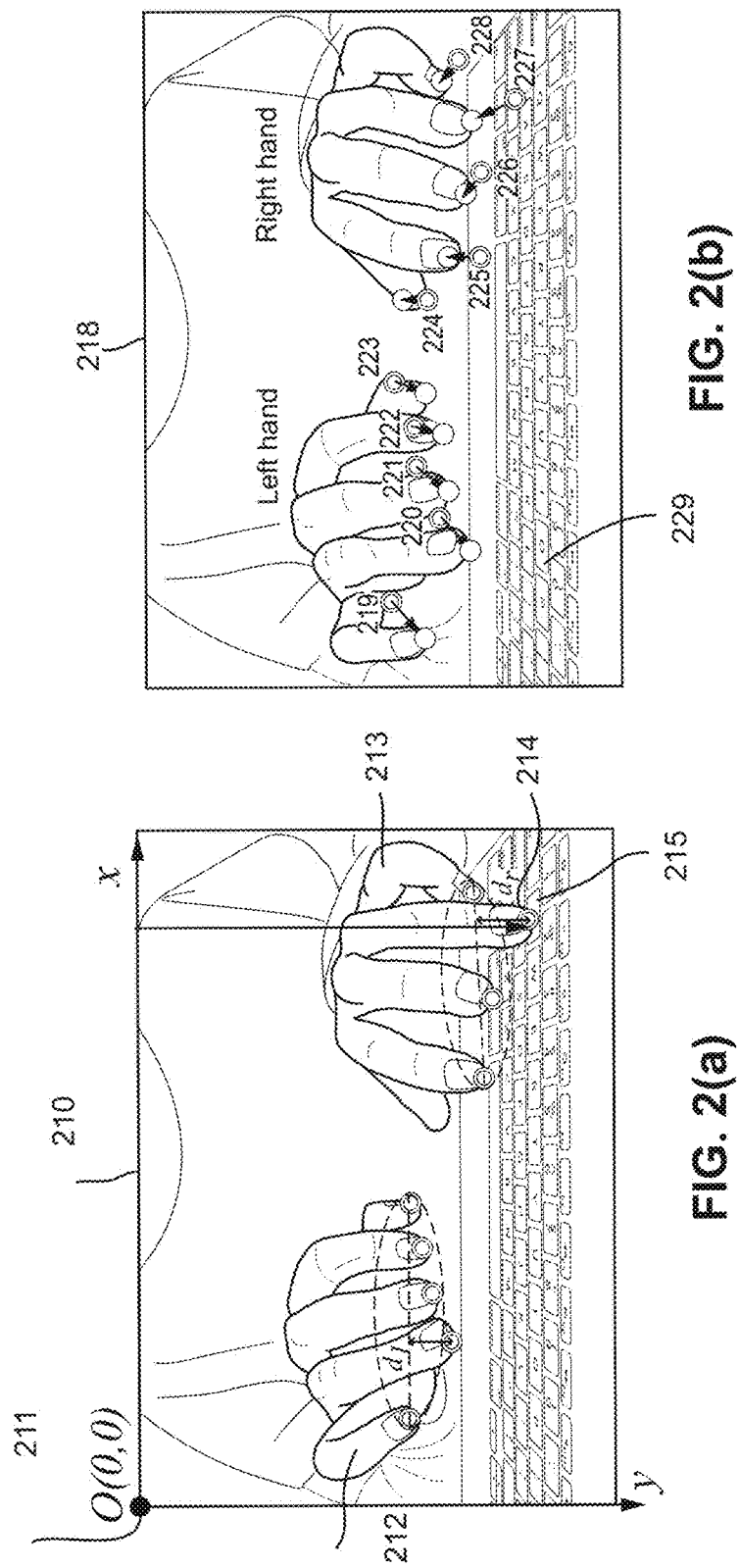

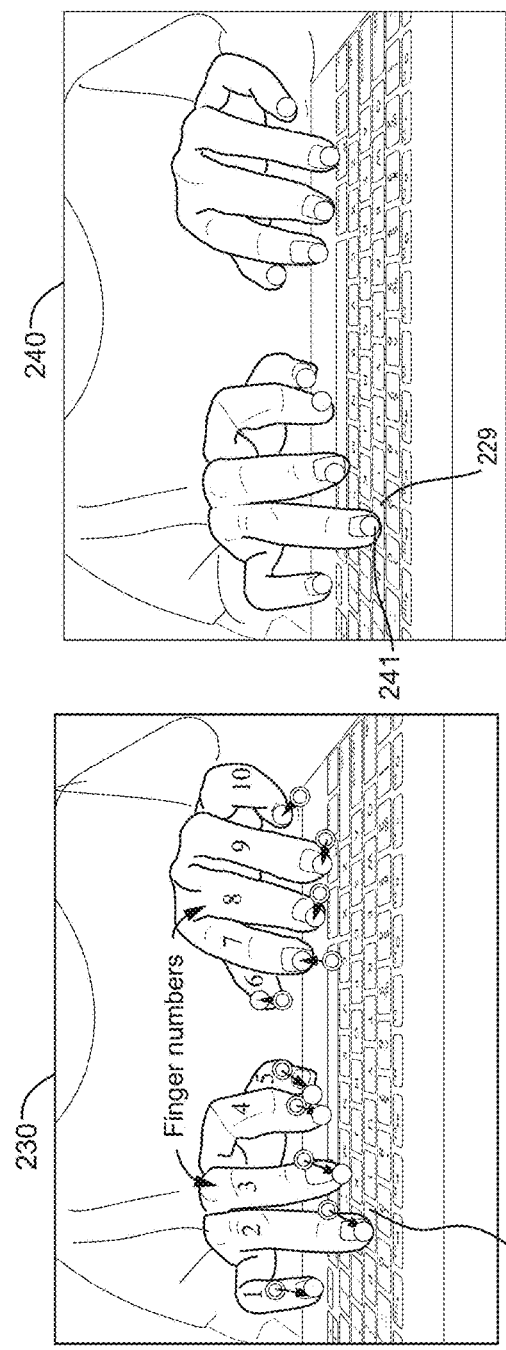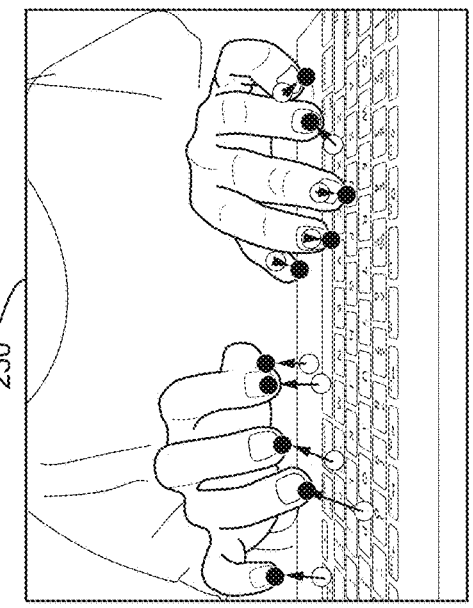

SYSTEMS, METHODS AND TECHNIQUES FOR INPUTTING TEXT INTO MOBILE DEVICES USING A CAMERA-BASED KEYBOARD

FIELD OF THE DISCLOSURE

Example embodiments disclosed herein relate generally to user interaction with mobile devices, and more particularly to systems, methods and techniques for inputting text into small mobile devices using a camera-based keyboard. Still more particularly, the techniques herein relate to a camera-based keyboard which allows a user to input text into mobile devices through detecting and localizing keystrokes based on images captured while the user is typing on the keyboard.

BACKGROUND AND SUMMARY

Due to their inherent portability, mobile devices like smartphones and Apple Watch have converged to a relatively small form factor. On the other hand, however, mobile devices present a whole new class of design challenges due to their small size. In particular, interacting with small mobile devices, such as text-entry on mobile devices, involves many challenges.

Therefore, recent research work has been conducted on redesigning visual keyboards for text entry on mobile devices, such as wearable keyboards, modified on-screen keyboards, and projection keyboards.

Wearable keyboards are designed to allow a user to input text on mobile devices, for example, a ring put on each finger to detect the finger's movements based on an accelerometer or a gyroscope, a glove equipped with a pressure sensor for each finger, or two rubber pads slipped onto at least one hand typing to sense the movements in the user's palm. Moreover, modified on-screen keyboards adaptively change the sizes of keys on a screen, use the information about a user's hand posture to improve the usability of the text entry system, or utilize a touch sensor on the back side of a device to enable ten-finger touch typing. Further, to take advantage of the traditional QWERTY keyboard layout, various projection keyboards are proposed. These visual keyboards normally use a visible light projector or an infrared projector to cast a keyboard, and then use optical ranging or image recognition methods to identify keystrokes. In addition, UbiK (see J. Wang, K. Zhao, X. Zhang, and C. Peng, "*Ubiquitous keyboard for small mobile devices: Harnessing multipath fading for fine-grained keystroke localization,*" in Proc. of ACM MobiSys, 2014) uses a microphone on a mobile device to localize keystrokes.

However, there are still issues with these redesigned keyboards. For example, the wearable keyboards require additional equipment, the on-screen keyboards only support single-finger text entry and usually take up a large area on the screen, and the projection keyboards need an infrared or visible light projector to display a keyboard. The UbiK requires users to click keys with their fingertips and nails to make audible sounds, while users normally use their finger pads, instead of finger nails, to type on a keyboard. Moreover, generated audio sounds might be buried in noises.

In view of the above issues, example embodiments of the technology described herein provide input systems comprising a camera-based keyboard, which works with a front-facing camera on a mobile device, and methods for inputting text on mobile devices using a camera-based keyboard. FIG. 1 shows a non-limiting example embodiment of a camera-based keyboard for text-entry on a mobile device. In FIG. 1, the example embodiment uses only the camera of a mobile device 100 and a paper keyboard 110, both of which can be easily carried. In particular, the camera on the mobile device 100 takes pictures while a user is typing on the paper keyboard 110, and then keystrokes are detected and localized based on the captured pictures 120.

In certain example embodiments of the technology described herein, keystrokes are detected and localized with high accuracy, and the corresponding characters of pressed keys are outputted without any noticeable time latency. By using image processing technology, at least a portion of the keys of a keyboard are extracted, a fingertip can be tracked, and a keystroke can be detected and localized. Moreover, in some example embodiments, an initial training may be conducted to enhance the image processing results, and/or online calibration may be used to further reduce the false positives of keystrokes. Additionally, in some example embodiments, time-consuming modules are optimized for running on mobile devices.

In accordance with an example embodiment, an input system is provided to allow a user to interact with a mobile device, such as to input text into the mobile device, via a keyboard including a plurality of keys. The keyboard may simply be printed on a piece of panel, like a paper. The input system comprises a processor system including at last one processor. The processor system is configured to at least capture a plurality of images regarding the keyboard and at least one hand typing on the keyboard via the camera. Based on the plurality of captured images, the processor system is further configured to locate the keyboard, extract at least a portion of the keys on the keyboard, extract a hand typing, and detect a fingertip of the extracted hand. After that, a keystroke may be detected and localized through tracking the detected fingertip in at least one of the plurality of captured images, and then a character corresponding to the localized keystroke may be determined.

To illustrate an example implementation of detecting and localizing keystroke based on image processing techniques, the observations of a keystroke will be first described. FIGS. 2(a)-2(e) show the example frames/images 210, 218, 230, 240, and 250 captured by a camera during two consecutive keystrokes. The coordinates of these images are shown in FIG. 2(a). The origin 211 of the coordinates is located in the top left corner of these images. In the embodiment, as shown in FIG. 2(a), the hand 212 located in the left area of the image is referred as the left hand, while the other hand 213 is referred as the right hand. In FIG. 2(a), the fingertip 214 pressing a key is referred as a StrokeTip, and the key 215 pressed by a fingertip is referred as a StrokeKey. From the left to the right, the fingers 219-228 in FIG. 2(b) are referred as finger i, i∈[1, 10], respectively.

Both FIGS. 2(a) and 2(d) show that a StrokeTip (e.g., 214 or 241) is located on a StrokeKey (e.g., 215 or 242), in accordance with certain example embodiments. In particular, FIG. 2(a) illustrates that a StrokeTip (e.g., the StrokeTip 214) has the largest vertical coordinate among all of the fingers of the same hand. As shown in FIG. 2(a), the vertical distance dr between the StrokeTip 214 and the remaining fingertips of the right hand is larger than that of the left hand ($d_l$). However this feature may not work very well for thumbs, which would need to be identified separately. Moreover, in considering the difference caused by the distance between a camera and a fingertip, in some cases, this feature may not be satisfied. This feature therefore is only used to assist the localization of a keystroke, but not to directly determine a keystroke.

FIGS. 2(b) and 2(c) show that, before pressing a key, a user keeps moving one of his/her fingers towards a target key, i.e., key 229 in FIGS. 2(b)-2(d). When the user is pressing the target key 229, the corresponding StrokeTip 241 stays on that key for a period of time, as shown in FIG. 2(d). If the position of the fingertip remains the same for a predetermined period of time, a keystroke may happen. FIG. 2(d) shows that the StrokeTip 241 obstructs the StrokeKey 229 from the view of the camera. The ratio of the visually obstructed area to the whole area of a key may be used to verify whether the key is pressed.

Viewed from a second aspect, the present invention provides a method of using a keyboard for allowing a user to interact with a mobile device, comprising capturing a plurality of images in connection with the keyboard and at least one hand typing on the keyboard via the camera, locating the keyboard based on at least one of the plurality of captured images, extracting at least a portion of the keys on the keyboard based on at least one of the plurality of captured images, extracting a hand based on at least one of the plurality of captured images, detecting a fingertip of the extracted hand based on at least one of the plurality of captured images, detecting and localizing a keystroke through tracking the detected fingertip based on at least one of the plurality of captured images; and determining a character corresponding to the localized keystroke.

Viewed from a third aspect, the present invention provides an non-transitory computer-readable storage medium storing a text-entry program, the text entry program being executable by a processor system including at least one processor, wherein the text entry program allows the processor system to execute: capturing a plurality of images in connection with a keyboard and at least one hand typing on the keyboard via a camera, locating the keyboard based on at least one of the plurality of captured images; extracting at least a portion of the keys on the keyboard based on at least one of the plurality of captured images; extracting at least a hand based on at least one of the plurality of captured images; detecting a fingertip of the extracted hand based on at least one of the plurality of captured images; detecting and localizing a keystroke through tracking the detected fingertip based on at least one of the plurality of captured images; and determining a character corresponding to the localized keystroke.

Example issues addressed by the technique of the exemplary embodiment are described as follows:

(1) High Accuracy in Keystroke Localization:

The accuracy of keystroke localization may not be sufficiently high due to an inter-key distance of about two centimeters, or a positional difference between a real fingertip and a detected fingertip. To address this issue, in certain example embodiments, hand detection results are optimized by adopting erosion and dilation technologies. In an example embodiment, for each fingertip, a small hit box area is generated around a detected fingertip position to represent a corresponding fingertip, and for each key, a visually obstructed area of the key is calculated to verify whether the key has been pressed.

(2) Low False Positive in Keystroke Detection:

A false positive occurs when a non-keystroke (i.e., no key is pressed by any fingertip) is incorrectly treated as a keystroke. Therefore, in certain example embodiments, a keystroke detection process is combined with a keystroke localization process, more particularly, if there is an invalid key pressed by a fingertip, the potential non-keystroke would be removed. Moreover, in some example embodiments, online calibration technology may be introduced to further reduce false positives in keystroke detection.

(3) Low Latency:

Ideally, when a user presses a key on a paper keyboard, the character of the key should be identified without any noticeable time latency. However, image processing is usually computationally heavy and hence time consuming, especially when being run on small mobile devices. To address this challenge, in certain example embodiments, image sizes are reduced, an image processing process is optimized, multi-threads are adopted, and/or the operations of writing into and reading from image files are eliminated.

Example embodiments of the technology described herein allow users to type in on a paper keyboard with all of their fingers and provide a user experience similar to that of a traditional physical keyboard. In an example embodiment, a keyboard may also be printed/drawn on any other panels. These example embodiments can be used in a wide variety of scenarios, for example, anywhere there is sufficient space to put a mobile device and a paper keyboard, e.g., offices, coffee shops, outdoor environments, etc.

Other aspects, features, and advantages of this invention will become apparent from the following detailed description when taken in conjunction with the accompanying drawings, which are a part of this disclosure and which illustrate, by way of example, principals of this invention.

BRIEF DESCRIPTION OF THE DRAWINGS

The accompanying drawings facilitate an understanding of the various preferred embodiments of this invention. In such drawings:

FIG. 2(a)-2(e) illustrative a plurality of exemplary images captured during two consecutive keystrokes.

DETAILED DESCRIPTION OF EXEMPLARY
EMBODIMENTS

In accordance with certain exemplary embodiments, certain systems, device, processes and methods are disclosed for text entry on mobile devices, more particularly, certain exemplary embodiments relate to a camera-based keyboard for mobile devices, are described herein. In the following description, for purpose of explanation, numerous specific details are set forth to provide a thorough understanding of the exemplary embodiments. It will be evident, however, to person skilled in the art that the exemplary embodiments may be practiced without these specific details.

A. System Overview

Figure 3:
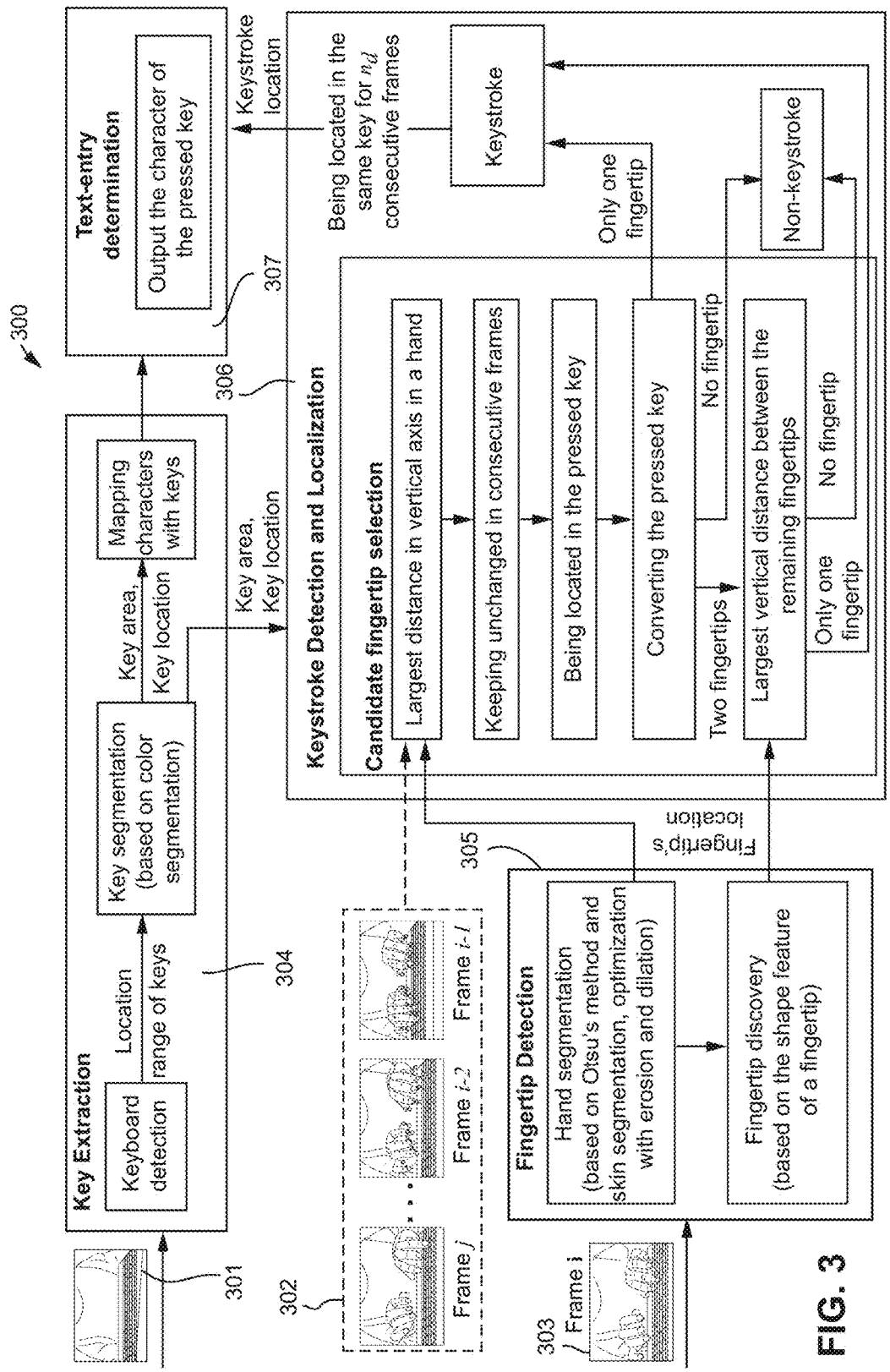
FIG. 3 is a block diagram illustrating the system architecture of an example embodiment of the technology described herein.

Referring now to FIG. 3, a block diagram 300 illustrating the system architecture of an example embodiment of the technology described herein. Some example embodiments may have different and/or other sub-modules than the ones described herein. Similarly, the functions can be distributed among the sub-modules in accordance with other embodiments in a different manner than is described herein.

In FIG. 3, the input to the example embodiment are images 301-303 taken by a camera and the output is the corresponding character for each pressed key. Before a user begins typing on a keyboard, key extraction techniques are used to detect the keyboard and extract each key from an inputted image. When the user types, in order to track fingertips, fingertip detection techniques are used to extract at least one hand and to detect a fingertip based on finger shapes. After that, based on the movements of the detected fingertips, keystroke detection and localization techniques are used to detect a possible keystroke and then localize the keystroke. Finally, text-entry determination techniques are used to output the character of the pressed key.

Accordingly, an example method using a camera-based keyboard for text entry on a mobile device consists of: key extraction 304, fingertip detection 305, keystroke detection and localization 306, and text-entry determination 307, as detailed below.

Figure 1:
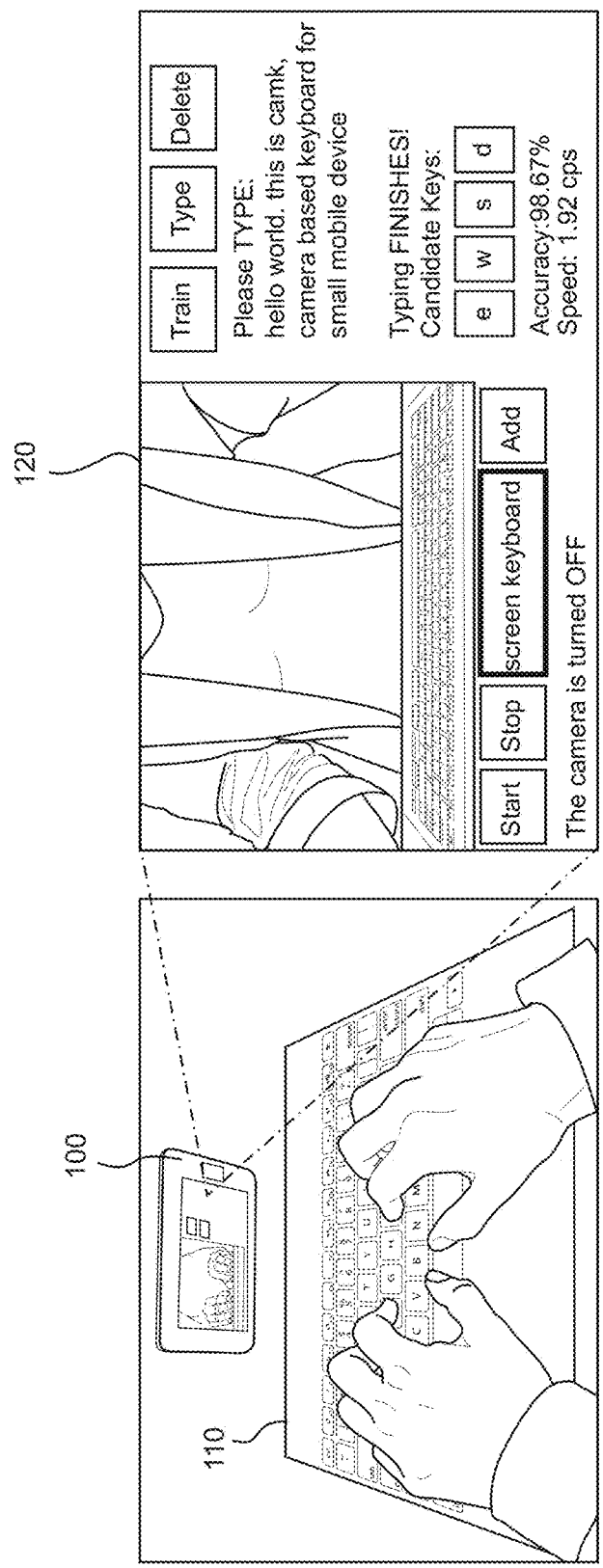
FIG. 1 shows a non-limiting example embodiment of a camera-based keyboard for text-entry on a mobile device.

Key Extraction:

Example embodiments of the technology described herein adopt the common QWERTY keyboard layout, and the keyboard is printed in black and white on a piece of panel, such as a paper, as shown in FIG. 1. In certain example embodiments, edge detection techniques are used to locate the keyboard and then color segmentation techniques are used to extract at least a portion of the keys on the keyboard. In particular, among the extracted keys, a space key has the largest area, the location of the space key thus can be used to infer the locations of other keys.

Fingertip Detection:

In certain example embodiments, by using Otsu's method (See https://en.wikipedia.org/wiki/Otsu%27s_method, 2015) and skin segmentation techniques, a user's hands are extracted from captured images. After that, fingertips are detected based on finger shapes, i.e., using the convex vertex of a finger's contour to represent its fingertip. Additionally, initial training is introduced to obtain the features of a user's typing behaviors and calculate the optimal values of the parameters used for subsequent image processing.

Keystroke Detection and Localization:

In certain example embodiments, consecutive frames/images are combined to track fingers for keystroke detection. In an example embodiment, if a user's finger stays at the same key for two or more frames, a keystroke may be detected, and the position of the fingertip pressing that key is treated as the position of the keystroke. In another example embodiment, for a possible keystroke, candidate keys around the keystroke are first selected, and then the visually obstructed areas of these selected keys are calculated to localize the key with the largest visually obstructed area. Further, in some example embodiments, online calibration is introduced to utilize the movement features of detected fingertips to remove non-keystrokes.

Text-Entry Determination:

When a keystroke has been localized, the character of the pressed key will be outputted immediately. However, due to the high time cost in image processing, there might be a long time latency in keystroke detection and localization. Therefore, in certain example embodiments, various optimization techniques are adopted to reduce the time cost of each module, in order to output characters without a noticeable time latency.

B. Key Extraction

In certain example embodiments, before a user starts to type on a keyboard, the keys of the keyboard first need to be extracted from at least one captured image. In some example embodiments, in order to eliminate background effects, the boundary of a keyboard first needs to be detected, and then each key will be extracted from the keyboard. Therefore, as shown in FIG. 3, a key extraction process consists of: 1) keyboard detection, 2) key segmentation, and 3) mapping characters into keys.

To allow the flexibility of placing a keyboard, in certain example embodiments, the whole keyboard is not required to be perfectly placed from the prospective of a camera. In order to show the detected keys clearly, in certain example embodiments, some areas of the keyboard are not within the camera's view. Even if some keys are out of the camera's view, these example embodiments can still work well.

Figure 4C:
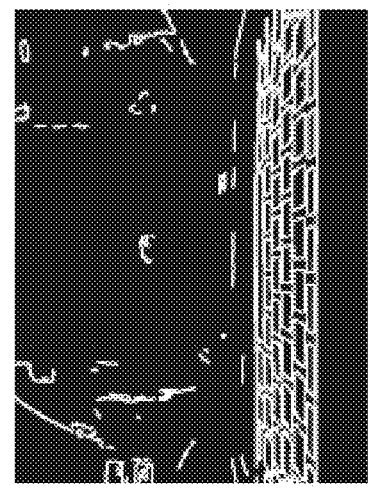
FIG. 4(c) shows a non-limiting example optimized edge detection result based on the edge detection result shown in FIG. 4(b).
Figure 4F:
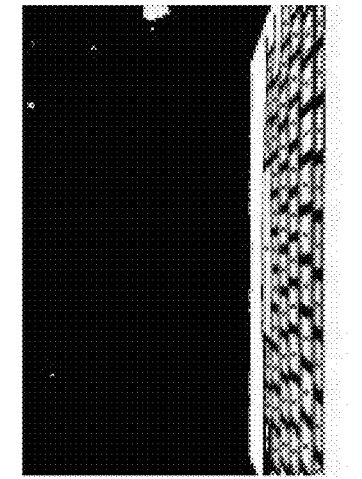
FIG. 4(f) shows a non-limiting example key segmentation result based on the image shown in FIG. 4(e).
Figure 4B:
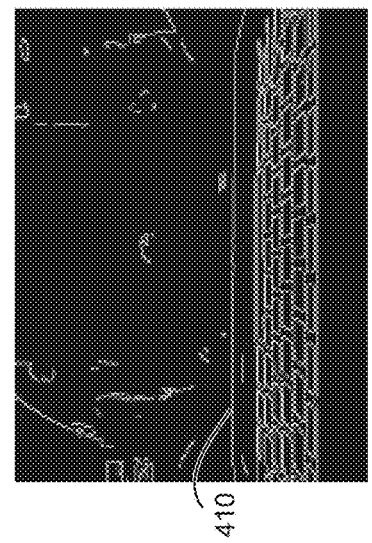
FIG. 4(b) shows a non-limiting example edge detection result based on the input image shown in FIG. 4(a).
Figure 4E:
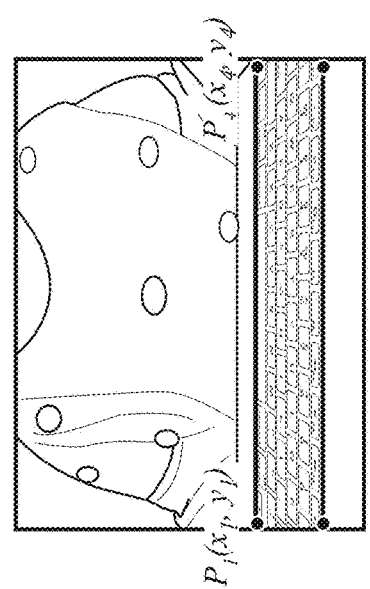
FIG. 4(e) shows non-limiting example intersections used to describe the boundary of the camera-based keyboard shown in FIG. 4(a).
Figure 4A:
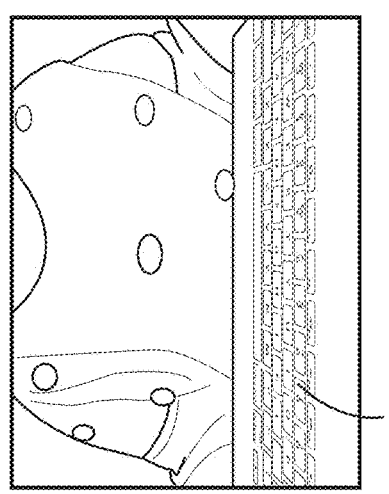
FIG. 4(a) shows an input image for a key extraction process in accordance with a non-limiting example embodiment.
Figure 4D:
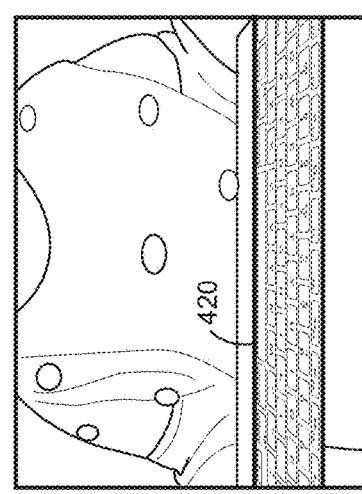
FIG. 4(d) shows a non-limiting example position range of a camera-based keyboard determined based on the input image shown in FIG. 4(a).

1) Keyboard Detection:

In an example embodiment, Canny edge detection algorithm (See R. Biswas and J. Sil, "An improved canny edge detection algorithm based on type-2 fuzzy sets," *Procedia Technology*, vol. 4, pp. 820-824, 2012 is used to obtain the edges of a keyboard. For example, FIG. 4(b) shows an example edge detection results of keyboard 400 in FIG. 4(a) using the Canny edge detection algorithm. However, in the example embodiment, interference edges (e.g., the paper's edge/longest edge 410 in FIG. 4(b)) should be removed. In addition, FIG. 4(b) shows that the edges of the keyboard should be close to the edges of its keys. Accordingly, pitfall edges are removed in the example embodiment, as shown in FIG. 4(c). Additionally, in the example embodiment, in order to make the edges of the keyboard more apparent, dilation operation (See S. A. Naji, R. Zainuddin, and H. A. Jalab, "Skin segmentation based on multi pixel color clustering models," *Digital Signal Processing*, vol. 22, no. 6, pp. 933-940, 2012) may be adopted to join disparate edge points that are close to each other. After that, Hough transform (See Z. Zhang, Y. Wu, Y. Shan, and S. Shafer, "*Visual panel: Virtual mouse, keyboard and 3d controller with an ordinary piece of paper*," in Proc. of ACM PUI, 2001.) may be used to further detect lines in FIG. 4(c). Then, the uppermost line 420 and the bottom line 430 are used to describe the position range of the keyboard 400, as shown in FIG. 4(d).

Similarly, in other example embodiments, the Hough transform is also used to detect the left/right edge of a keyboard. If there is no suitable edge detected by the Hough transform, it is usually because some keys are out of the camera's view. In some example embodiments, to simplify the issue, the left and right boundaries of an image are used to represent the left and right edge of a keyboard respectively. For example, as shown in FIG. 4(e), the four edges (lines) are extended to get four intersections $P_1(x_1,y_1)$, $P_2(x_2,y_2)$, $P_3(x_3,y_3)$, and $P_4(x_4,y_4)$, which are used to describe the boundary of a keyboard.

2) Key Segmentation:

In an example embodiment, when the location of a keyboard is known, keys may be extracted from the keyboard based on color segmentation techniques. In a YCrCb space, the color coordinate (Y, Cr, Cb) of a white pixel is (255, 128, 128), while that of a black pixel is (0, 128, 128). Thus, the differences in the Y values between pixels are used to distinguish white keys from a black background. If a pixel is located in the keyboard, while satisfying $255-\epsilon_y \leq Y \leq 255$, the pixel belongs to a key. The offsets $\epsilon_y \in N$ of Y is mainly caused by lights. In another example embodiments, $\epsilon_y$ may be estimated during an initial training (as detailed below). In a preferred example embodiment, the initial/default value of $\epsilon_y$ is set to be 50. However, $\epsilon_y$ may also be set to be other values.

In certain example embodiments, to obtain white pixels, the contours of the keys need to be acquired and the keys need to be separated from one another. In considering the pitfall areas, such as small white areas that do not belong to any key, the area of each key will be estimated at first. Based on FIG. 4(e), $P_1$, $P_2$, $P_3$, and $P_4$ are used to calculate the area of the keyboard $S_b$ as:

$$S_b = \tfrac{1}{2} \cdot (|\overrightarrow{P_1P_2} \times \overrightarrow{P_1P_4}| + |\overrightarrow{P_3P_4} \times \overrightarrow{P_3P_2}|)$$

Then, the area of each key is calculated. N represents the number of keys in the keyboard. In considering the size differences between keys, in certain example embodiments, larger keys (e.g., a space key) are treated as multiple regular keys (e.g., A-Z, or 0-9). For example, a space key may be treated as five regular keys. In this way, N is changed to be $N_{avg}$. Then, the average area of a regular key is estimated to be $S_b/N_{avg}$. In addition to the size differences between keys, distance differences between a camera and the keys can also affect the area of a key in the image. Therefore, $a_l$, and $a_h$ are introduced to describe the range of a valid area $S_k$ of a key as:

$$S_k \in \left[ \alpha_l \cdot \frac{S_b}{N_{avg}},\ \alpha_h \cdot \frac{S_b}{N_{avg}} \right]$$

In a preferred example embodiment, $a_l$ is set to be 0.15, $a_h$ is set to be 5, based on extensive experiments. Of course, $a_l$ and $a_h$ may also be other values. FIG. 4(f) shows an example key segmentation result of the image shown in FIG. 4(e). In certain example embodiments, the location of a space key (the biggest key) is used to locate other keys, based on the relative locations between keys.

C. Fingertip Detection

In certain example embodiments, in detecting keystrokes, fingertips need to be first detected, and then the movements of the detected fingertips need to be tracked. In particular, a fingertip detection process consists of: 1) hand segmentation and 2) fingertip discovery.

1) Hand Segmentation:

Skin segmentation technique (See S. A. Naji, R. Zainuddin, and H. A. Jalab, "*Skin segmentation based on multi pixel color clustering models,*" Digital Signal Processing, vol. 22, no. 6, pp. 933-940, 2012) is a common method used for hand detection. In an example YCrCb color space, a pixel (Y, Cr, Cb) is determined to be a skin pixel, if it satisfies Cr ∈[133, 173] and Cb∈[77, 127]. However, the threshold values of Cr and Cb may be affected by surroundings, such as lighting conditions, and it is difficult to choose suitable threshold values for Cr and Cb. Therefore, in an example embodiment, the Otsu's method is combined with the red channel Cr in an YCrCb color space for skin segmentation.

Figure 5C:
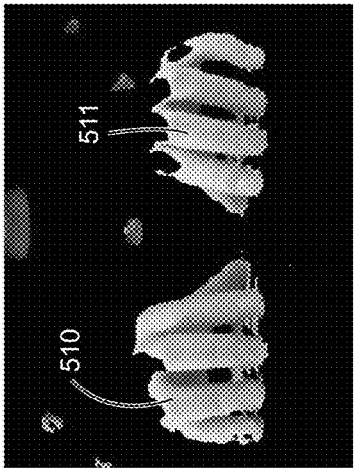
FIG. 5(c) shows a non-limiting example optimized result for a hand segmentation process based on the hand segmentation result shown in FIG. 5(b).
Figure 5F:
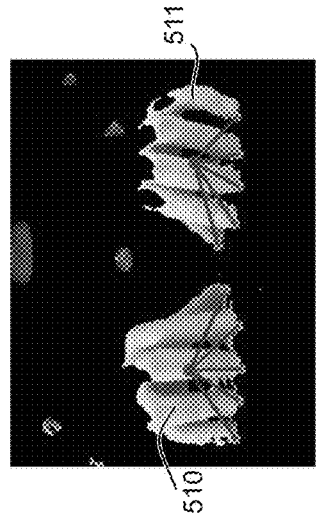
FIG. 5(f) shows non-limiting example markups of detected fingertips.
Figure 5B:
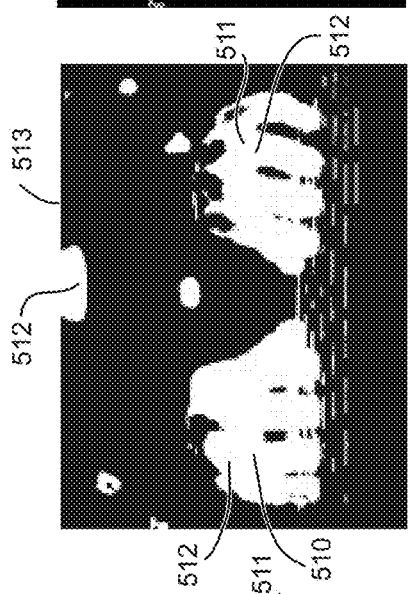
FIG. 5(b) shows a non-limiting example result of hand segmentation based on the input image shown in FIG. 5(a).
Figure 5E:
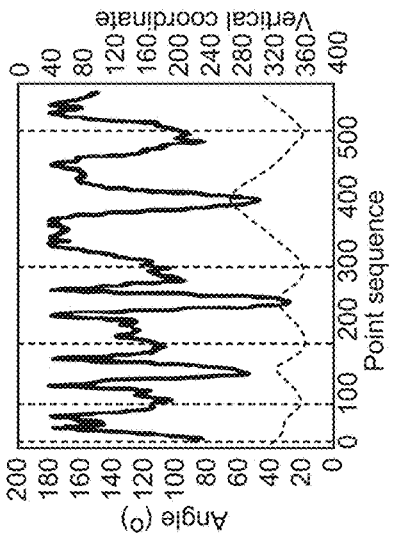
FIG. 5(e) shows non-limiting example shape features of the detected fingers and example relative positions of detected fingertips in vertical coordinates.
Figure 5A:
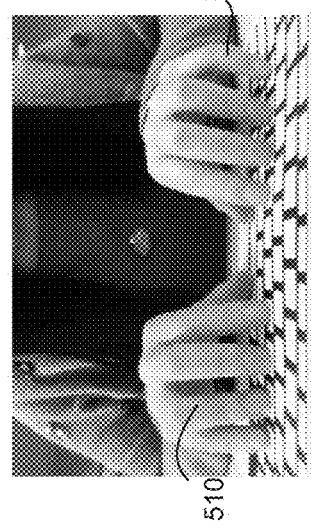
FIG. 5(a) shows an input image for a non-limiting example hand segmentation process.

In an YCrCb color space, the red channel Cr is usually essential to human skin coloration. Therefore, in certain example embodiments, for a captured image, the grayscale image split based on Cr channel is used as an input to the Otsu's method. The Otsu's method can automatically perform clustering-based image thresholding, for example, calculating an optimal threshold for separating a foreground from a background. FIG. 5(a) shows an illustrative example input image for an example hand segmentation process. FIG. 5(b) shows the result of hand segmentation based on the input image shown in FIG. 5(a). In FIG. 5(b), the white regions 512 represent hand regions, and the black regions 513 represent the background of the image. However, in FIG. 5(b), there are some interference regions around the hands, which may change the contours of fingers, and hence wrong fingertips may be detected. As a result, in certain example embodiments, erosion and dilation operations are used to mitigate the effect of interference regions. In particular, for example, the erosion operation may be used to isolate the hands from the keys and separate fingers from each other, and then the dilation operation may be used to smooth the edges of the fingers. FIG. 5(c) shows an example optimized result of the hand segmentation process. Intuitively, the closer the color of a user's clothes is to his/her skin color, the worse the hand segmentation result may be. In the exemplary embodiment, although only the hand regions within the keyboard area are focused on, the hands can still be extracted effectively, based on the color difference between the keyboard and human skin.

Figure 6A:
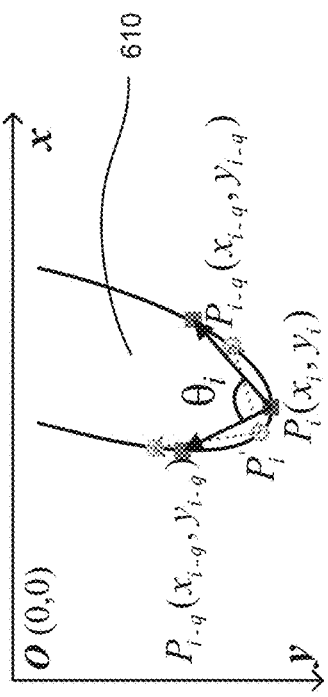
FIG. 6(a) shows a detected fingertip in accordance with a non-limiting example embodiment.

2) Fingertip Discovery:

After fingers are extracted, the corresponding fingertips then need to be detected. FIG. 6(a) shows a detected fingertip 610 in accordance with an example embodiment. As shown in FIG. 6(a), in certain example embodiments, a fingertip is usually a convex vertex of the corresponding finger. In an example embodiment, for a point $P_i(x_i,y_i)$ located in the contour of a hand, by tracing the contour, the point $P_{1-q}(x_{i-q},y_{i-q})$ before $P_i$ and the point $P_{i+q}(x_{i+q},y_{i+q})$ after $P_i$ can be selected. Here, i, q∈N. In the example embodiment, the angle $\theta_i$ between the two vectors $\overrightarrow{P_iP_{i-q}}$ and $\overrightarrow{P_iP_{i+q}}$ is calculated according to Equation (1).

$$\theta_i = \arccos \frac{\overrightarrow{P_iP_{i-q}} \cdot \overrightarrow{P_iP_{i+q}}}{|\overrightarrow{P_iP_{i-q}}| \cdot |\overrightarrow{P_iP_{i+q}}|} \quad (1)$$

In order to simplify the calculation of $\theta_i$, in the example embodiment, $\theta_i$ is mapped in a range: $\theta_i \in [0°, 180°]$, and if $\theta_i \in [\theta_l, \theta_h]$ and $\theta_i < \theta_h$, $P_i$ is referred as a candidate vertex. In considering the relative locations of these points, $P_i$ should also satisfy $y_i > y_{i-q}$ and $y_i > y_{i+q}$. Otherwise, $P_i$ will not be a candidate vertex. In the example embodiment, if there are multiple candidate vertexes, such as $P_i'$ in FIG. 6(a), the vertex with the largest vertical coordinate is chosen as $P_i$, as this point has the largest probability to be a fingertip. Based on extensive experiments, in a preferred example embodiment, $\theta_l=60°$, $\theta_h=150°$, and q=20.

Figure 6B:
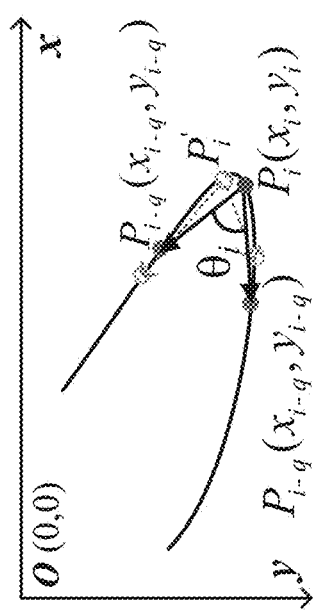
FIG. 6(b) shows a detected thumb in a left hand in accordance with a non-limiting example embodiment.

In considering the uniqueness of thumbs (e.g., it may press a key in a way different from other fingers), the relative positions of $P_{i-q}$, $P_i$, and $P_{i+q}$ may change. FIG. 6(b) shows a detected thumb in a left hand in accordance with an example embodiment. Obviously, in FIG. 6(b), $P_{i-q}$, $P_i$, and $P_{i+q}$ do not satisfy $y_i > y_{i-1}$ and $y_i > y_{i+q}$. Therefore, $(x_i-x_{i-q}) \cdot (x_i-x_{i+q}) > 0$ is instead used to describe the relative locations of $P_{i-q}$, $P_i$, and $P_{i+q}$ in thumbs, and then the vertex having the largest vertical coordinate is chosen as the fingertip.

Figure 5D:
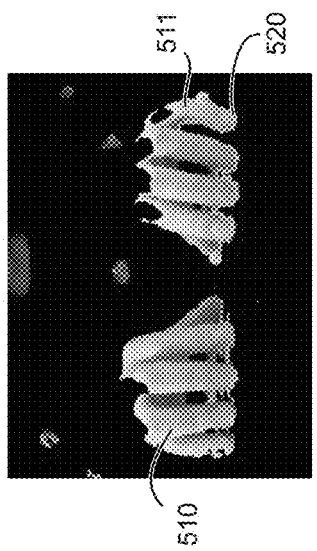
FIG. 5(d) shows a non-limiting example contour surrounding the fingers of the hands shown in FIG. 5(c).

FIG. 5(d) shows an example contour surrounding the fingers of a hand. During a fingertip detection process, only the points located in the bottom edge (e.g., from the left most point to the right most point) of a hand need to be detected, such as the contour 520 surrounding the fingers of the right hand 511 in FIG. 5(d). FIG. 5(e) shows illustrative example shape features of a finger 9, and example relative positions of the detected fingertips in vertical coordinates $y_i$. If five fingertips in a hand with $\theta_i$ and $y_{i-q},y_i,y_{i+q}$ can be detected, the thumb does not need to be specially detected. Otherwise, the fingertip of the thumb in the right most area of the left hand 510 or the left most area of the right hand 511 needs to be detected according to $\theta_i$ and $x_{i-q}$, $x_i$, $x_{i+1}$. FIG. 5(f) shows example markups of the detected fingertips shown in FIG. 5(a).

D. Keystroke Detection and Localization

When fingertips are detected, these fingertips can be tracked to detect a possible keystroke and to localize the detected keystroke. In certain example embodiments of the technology described herein, imaging processing techniques are used for keystroke detection and localization. The results of keystroke localization can then be used to remove the non-keystrokes, i.e., to reduce the false positive rate of keystroke detection. In other words, keystroke detection and keystroke localization are correlated with each other. Therefore, the process of both keystroke detection and localization will be described together as follows.

1) A Candidate Fingertip of Each Hand:

in certain example embodiments of the technology described herein, users are allowed to use all of their fingers for text-entry, thus keystrokes may be caused by either the left hand or the right hand. According to the observations of a keystroke, a fingertip pressing a key (i.e., a StrokeTip) usually has the largest vertical coordinate in that hand. Therefore, a candidate fingertip with the largest vertical coordinate is selected in each hand. $C_l$ and $C_r$ represent the points located in the contour of the left and right hand respectively. For all points in $C_l$, if a point $P_j(x_j,y_j)$ satisfies $y_l \geq y_j$, $l \neq j$, $P_j \in C_l$, then $P_l$ will be selected as the candidate fingertip in the left hand. Similarly, the candidate fingertip $P_r(x_r, y_r)$ in the right hand can be selected. In this step, only $P_l$ and $P_r$ are needed to determine the moving states of hands.

2) Moving or Staying:

As described above with respect to the observations of a keystroke, when a user presses a key, the corresponding fingertip will stay at that key for a certain period of time. Therefore, in certain example embodiments, the location variation of the candidate fingertip is used to detect a possible keystroke. In Frame i, $P_{l_i}(x_{l_i},y_{l_i})$ and $P_{r_i}(x_{r_i},y_{r_i})$ are used to represent the candidate fingertips in the left and right hands respectively. In view of FIG. 5(a)-5(f), the interference regions around a fingertip may affect the contour of the fingertip, and there may be a position deviation between a real fingertip and a detected fingertip. Therefore, if the candidate fingertips in frames i−1 and i satisfy Equation (2), these fingertips may be treated as static, i.e., a keystroke probably happens. Based on extensive experiments, in a preferred example embodiment, $\Delta r$ is set to be 5 empirically. Of course, $\Delta r$ may also be any other numbers.

$$\sqrt{(x_{l_i} - x_{l_{i-1}})^2 + (y_{l_i} - y_{l_{i-1}})^2} \leq \Delta r, \quad (2)$$

-continued $$\sqrt{(x_{r_i} - x_{r_{i-1}})^2 + (y_{r_i} - y_{r_{i-1}})^2} \leq \Delta r.$$

3) Discovering the Pressed Key:

In certain example embodiments, for a keystroke, the fingertip is located at the corresponding key and a part of the key will be visually obstructed by that fingertip, as shown in FIG. 2(d). In certain example embodiments, a thumb is treated as a special case, and hence it is first selected as a candidate fingertip. Then, candidate fingertip set Ctip={Pli, Pri, left thumb in frame i, right thumb in frame i} is determined. After that, the keystroke is localized by using Algorithm 1 as shown in Table 1.

TABLE 1

Algorithm 1 of Keystroke localization
Algorithm 1: Keystroke localization

Input: Candidate fingertip set $C_{tip}$ in frame i.
Remove fingertips out of the keyboard from $C_{tip}$.
for $P_i \in C_{tip}$ do
| Select four nearest candidate key set $C_{key}$ around $P_i$.
| for $K_j \in C_{key}$ do
| | if $P_i$ is located in $K_j$ then
| | | Calculate the coverge ratio $\rho k_j$ of $K_j$.
| | | if $\rho k_j < \rho_l$ then
| | |_ |_ |_ Remove $K_j$ from $C_{key}$.
| if $C_{key} \neq \emptyset$ then
| | Select $K_j$ with largest $\rho k_j$ from $C_{key}$.
| |_ $P_i$ and $K_j$ froms a combination $< P_i, K_j >$.
|_ else Remove $P_i$ from $C_{tip}$.
if $C_{tip} = \emptyset$ then No keystroke occurs, return.
if $|C_{tip}| = 1$ then
|_ Return the associated key of the only fingertip.
For each hand. select $< P_i, K_j >$ with largest ratio $\rho k_j$.
Use $< P_l, K_l >$ ($< P_r, K_r >$) to represent the fingertip and its associated key in left (right) hand.
Calculate $d_l$ ($d_r$) between $P_l$ ($P_r$) with the remaining fingertips in left (right) hand.
if $d_l > d_r$ then Return $K_l$. else Return $K_r$.
Output: The pressed key.

Eliminating the Impossible Fingertips:

For convenience, in example embodiments described herein, Pi is used to represent a fingertip in $C_{tip}$, i.e., $Pi \in C_{tip}$, $i \in [1,4]$. If a fingertip Pi is not located in the keyboard region, it is eliminated from the candidate fingertip set $C_{tip}$.

Figure 7A:
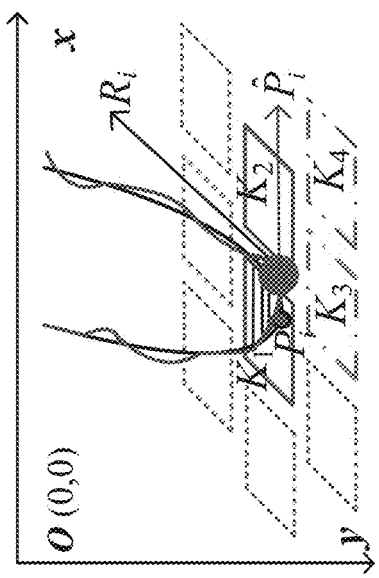
FIG. 7(a) shows the calculation of candidate keys based on a detected fingertip in accordance with a non-limiting example embodiment.
Figure 8A:
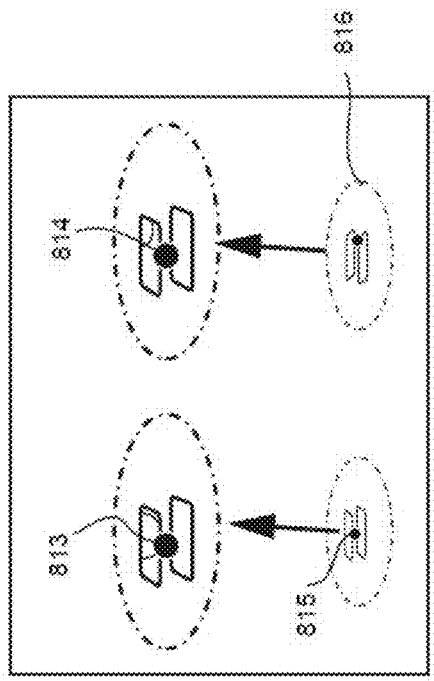
FIG. 8(a) shows candidate keys around fingertips in both hands in accordance with a non-limiting example embodiment.

Selecting the Nearest Candidate Keys:

For each candidate fingertip $P_i$, in certain example embodiments, the candidate keys that are probably pressed by $P_i$ are calculated first. FIG. 7(a) shows the calculation of candidate keys based on a detected fingertip in accordance with an example embodiment. As shown in FIG. 7(a), although $P_i$ is the real fingertip, the detected fingertip $\hat{P}_i$ is used to calculate the candidate keys, and $K_{cj}(x_{cj},y_{cj})$ is used to represent the centroid of key $K_j$. The two rows of keys that are closest to the location $\hat{P}_i(\hat{x}_i,\hat{y}_i)$ (i.e., the rows with two smallest $|y_{cj}-\hat{y}_i|$) can be determined. For each row, two closest keys (i.e., the keys with two smallest $|x_{cj}-\hat{x}_i|$) are selected. In FIG. 7(a), the candidate key set $C_{key}$ is consisted of $K_1$, $K_2$, $K_3$, and $K_4$. Similarly, FIG. 8(a) shows candidate keys (811 and 812) around fingertips (813 and 814) in both hands in accordance with an example embodiment.

Keeping the Candidate Keys Containing the Candidate Fingertip:

If a key is pressed by a user, the fingertip will be located in that key. Thus, in order to remove the invalid candidate keys, the location of the fingertip $\hat{P}(\hat{x}_i,\hat{y}_i)$ is used to verify whether a candidate key contains the fingertip. As shown in FIG. 7(a), there is a small deviation between the real fingertip $P_i$ and the detected fingertip $\hat{P}_i$. Therefore, the range of the detected fingertip $\hat{P}_i$ is extended to $R_i$, as shown in FIG. 7(a). If any point $P_k(x_k,y_k)$ in the range $R_i$ is located in a candidate key $K_j$, $\hat{P}_i$ is considered to be located in $K_j$. $R_i$ is calculated as $\{P_k \in R_i | \sqrt{(\hat{x}_i-x_k)^2+(\hat{y}_i-y_k)^2} \leq \Delta r\}$, i.e., $\Delta r = 5$.

Figure 7B:
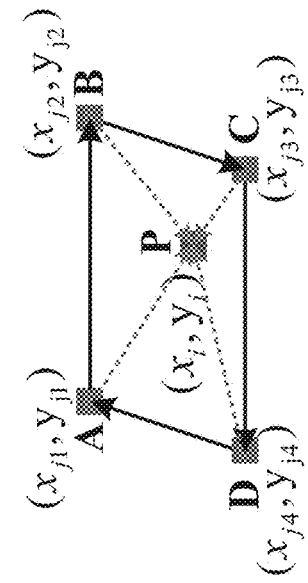
FIG. 7(b) shows the selection of candidate keys based on a detected fingertip in accordance with a non-limiting example embodiment.
Figure 8B:
FIG. 8(b) shows non-limiting example candidate keys containing the candidate fingertips shown in FIG. 8(a).

FIG. 7(b) shows the selection of candidate keys based on a detected fingertip in accordance with an example embodiment. As shown in FIG. 7(b), an example key is represented as a quadrangle ABCD. If a point is located in ABCD, the point will be located in the right side of each edge in ABCD, while moving around ABCD in clockwise direction. Therefore, if the fingertip $P \in R_i$ in FIG. 7(b) satisfies Equation (3), it is determined to be located within the key. As a result, the key will still be kept as a candidate key. Otherwise, the key will be removed from the candidate key set $C_{key}$. For example, in FIG. 7(a), $K_1$ and $K_2$ remain to be candidate keys. Further, FIG. 8(b) shows example candidate keys 815 and 816 containing the candidate fingertips 813 and 814 shown in FIG. 8(a).

$$\vec{AB} \times \vec{AP} \geq 0, \vec{BC} \times \vec{BP} \geq 0, \quad (3)$$
$$\vec{CD} \times \vec{CP} \geq 0, \vec{DA} \times \vec{DP} \geq 0.$$

Calculating the Coverage Ratios of Candidate Keys:

For a pressed key, it is visually obstructed by a fingertip, as the dashed area of key K1 shown in FIG. 7(a). In certain example embodiments, in order to remove wrong candidate keys, a coverage ratio is used to measure the visually obstructed area of a candidate key. For a candidate key Kj, whose area is Skj, its visually obstructed area is Dkj, then its coverage ratio is $$\rho_{k_j} = \frac{D_{k_j}}{S_{k_j}}.$$

Figure 8C:
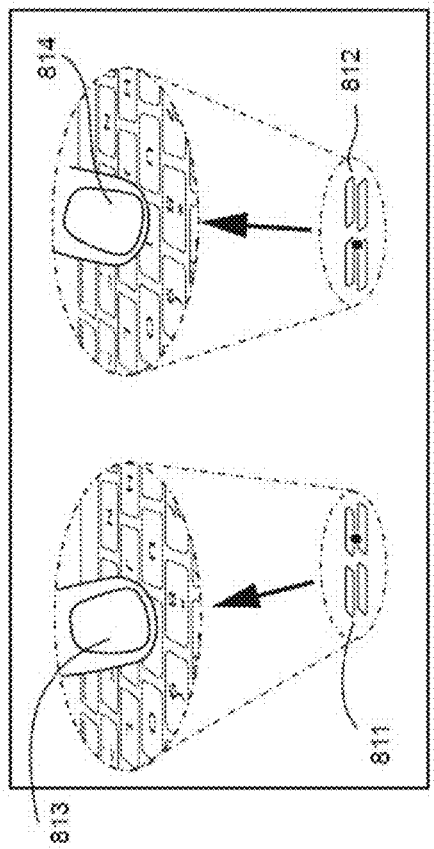
FIG. 8(c) shows the candidate fingertips shown in FIG. 8(a) and their corresponding visually obstructed keys.

For a larger key (e.g., a space key), the Pkj is updated by multiplying a key size factor fj, i.e., $$\rho_{k_j} = \min\left(\frac{D_{k_j}}{S_{k_j}} \cdot f_j, 1\right),$$

where fj=Sk$_j$/Sk. Here, Sk means the average area of a key. If $\rho kj \geq \rho l$, the key Kj is still a candidate key. Otherwise, it is removed from the candidate key set Ckey. In a preferred example embodiment, $\rho l$ is set to be 0.25. For each hand, if there are more than one candidate key, the key with the largest coverage ratio is kept as the final candidate key. For a candidate fingertip, if there is no candidate key associated with it, the candidate fingertip will be eliminated. FIG. 8(c) shows the candidate fingertips 813 and 814 and their associated keys 817 and 818 respectively.

4) Vertical Difference with the Remaining Fingertips:

In certain example embodiments, there is one candidate fingertip in each hand at most. If there is no candidate fingertip, then it is inferred that no keystroke happens. If there is only one candidate fingertip, then this candidate fingertip is a StrokeTip, and the associated candidate key is a StrokeKey. However, in certain example embodiments, if there are two candidate fingertips, the vertical distances between each candidate fingertip and the remaining fingertips are used to choose the most probable StrokeTip, as shown in FIG. 2(a).

Figure 8D:
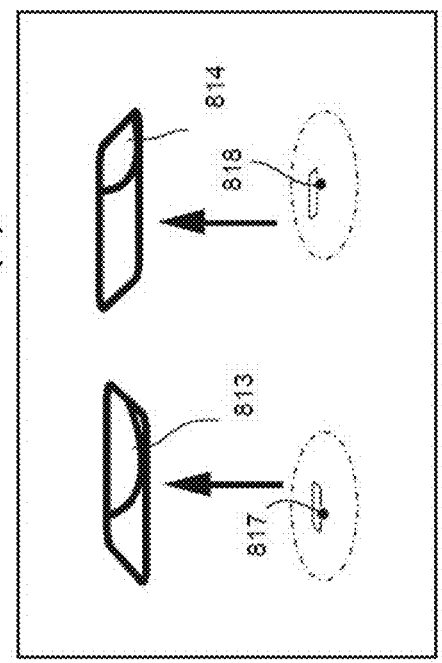
FIG. 8(d) shows the selection of a candidate fingertip as a StrokeTip in accordance with a non-limiting example embodiment.

In certain example embodiments, $P_l(x_l,y_l)$ and $P_r(x_r,y_r)$ represent the candidate fingertips in the left and right hands respectively. Then, the distance $d_l$ between $P_l$ and the remaining fingertips in the left hand is calculated, and the distance $d_r$ between $P_r$ and the remaining fingertips in the right hand is calculated. Here, $d_l=|y_l-\frac{1}{4}\cdot\Sigma_{j=1}^{j=5} y_j, j\neq l|$, while $d_r=|y_r-\frac{1}{4}\cdot\Sigma_{j=6}^{j=10} y_j, j\neq r|$, wherein $y_j$ represents the vertical coordinate of fingertip j. In these example embodiments, if $d_l>d_r$, $P_l$ is chosen as the StrokeTip. Otherwise, $P_r$ is chosen as the StrokeTip. The associated key for the StrokeTip is the pressed key—StrokeKey. FIG. 8(d) shows the selection of a candidate fingertip as a StrokeTip in accordance with an example embodiment. As shown in FIG. 8(d), fingertip 819 in the left hand is chosen as the StrokeTip. However, based on the observations, the distance between the camera and hands may affect the value of $d_l$ ($d_r$). Therefore, the unselected candidate fingertip (e.g., fingertip 820 in FIG. 8(d)) will not be discarded. Instead, its associated key is displayed as a candidate key, which may be selected by the user for text input (see FIG. 1).

E. Optimizations for Keystroke Localization and Image Processing

1) Initial Training

Optimal Parameters for Image Processing:

During a key segmentation process, in certain example embodiments, $\epsilon_y$ is used for tolerating the change of Y caused by environments. In these example embodiments, initially, $\epsilon_y$ is set to be 50, and then is updated by, e.g., $\epsilon_{y_i}=\epsilon_{y_{i-1}}+1$. When the number of extracted keys decreases, it stops. Similarly, in these example embodiments, $\epsilon_y$ is set to be 50 and updated by $\epsilon_{y_i}=\epsilon_{y_{i-1}}-1$. When the number of extracted keys decreases, it stops. During this process, when maximum number of keys are acquired, the corresponding value $\epsilon_{y_i}$ is selected as the optimal value of $\epsilon_y$.

In some example embodiments, a hand segmentation process involves erosion and dilation operations, which use a kernel B (see "Eroding and Dilating," http://docs.opencv.org/master/db/df6/tutorial_erosion_dilatation.html.) to process images. In order to get the suitable size of B, a user first puts his/her hands on the home row of a keyboard, as shown in FIG. 5(a). For simplicity, in these example embodiments, the kernel sizes for the erosion and dilation operation are set to be the same. In other example embodiments, the kernel sizes for the erosion and dilation operations may be different. In an example embodiment, the initial kernel size z0 is set to be 0, and then the kernel size zi is updated to be zi−1+1. When each fingertip on the correct key is localized with zi, then the kernel size z is set as zi.

Frame Rate Selection:

In certain example embodiments, the initial/default frame rate of a camera is set to be $f_0=30$ fps (frames per second), which is usually the maximal frame rate of many smartphones. For the ith keystroke, the number of frames containing the keystroke is represented as $n_{0_i}$. When the user has pressed u keys, the average number of frames acquired during a keystroke is $$\bar{n}_0 = \frac{1}{u} \cdot \sum_{i=1}^{i=u} n_{0_i}.$$

In fact, $n_0$ reflects the duration of a keystroke. As the frame rate f changes, the number of frames in a keystroke $\bar{n}_f$ changes as well. Intuitively, a smaller value of $\bar{n}_f$ may reduce the image processing time, while a larger value of $\bar{n}_f$ may improve the accuracy of keystroke localization. Based on extensive experiments, in a preferred example embodiment, $n_f$ is set to be 3, and then $$f = \left\lceil f_0 \cdot \frac{\bar{n}_f}{\bar{n}_0} \right\rceil.$$

Of course, $n_f$ may also be other values.

2) Online Calibration

Removing False Positive Keystroke:

Sometimes, fingers may keep still, even a user does not press any key. The non-keystroke may be accidentally treated as a keystroke, which leads to an error. As a result, in certain example embodiments, a temporary character is introduced to mitigate this problem.

In the process of pressing a key, a StrokeTip moves towards the key, stays at that key, and then moves away. The value of the vertical coordinate of the StrokeTip initially increases, then remains the same, and then decreases. In certain example embodiments, if a keystroke is detected in the $\bar{n}_f$ consecutive frames, current corresponding character will be displayed on the screen as a temporary character. In the next frame(s), if the position of the StrokeTip does not satisfy the features of a keystroke, the temporary character will be canceled. This does not have much impact on the user's experience, because of the short period of time between two consecutive frames. Moreover, candidate keys are displayed around the StrokeTip, and the user can choose them for text entry.

Movement of Smartphone or Keyboard:

In certain example embodiments, it is presumed that a mobile device and a keyboard are kept at stable positions during a text entry process. To get the best results, in preferred example embodiments, a user tapes on a paper keyboard on a panel. Of course, a paper keyboard may not be fixed on a panel in other embodiments. However, to alleviate this problem, there is a simple solution. For example, if the user uses the Delete key on the screen multiple times (e.g., more than 3 times), it may indicate that characters cannot be inputted correctly. The location of the mobile device or the keyboard may have been changed. Then, the user will be informed to move his/her hands away from the keyboard for relocation. After that, the user may continue typing.

3) Real Time Image Processing

As image processing is very time-consuming, it is difficult to make it work well on small mobile devices. Take a Samsung GT-I9100 smartphone as an example, when the size of an image is 640*480 pixels, it needs 630 ms to process this image in localizing the keystroke. Taking into account the time spent on taking images and processing consecutive images to track fingertips in detecting keystroke, the total time cost for localizing a keystroke would be as long as 1320 ms, which would lead to a very slow input speed and a bad user experience. Therefore, example embodiments of the technology described herein may need to be optimized as follows.

Adaptively Changing Image Sizes:

In certain example embodiments, small images (e.g., of 120*90 pixels) are used during two keystrokes in tracking fingertips, while a large image (e.g., of 480*360 pixels) is used in localizing keystroke.

Optimizing Processing of Large-Size Images:

In an example embodiment, when a possible keystroke is detected in $(x_c, y_c)$ of frame i−1, a small area $S_c=\{P_i(x_i,y_i) \in S_c \| |x_i-x_c| \leq \Delta x, |y_i-y_c| \leq \Delta y\}$ of frame i is focused to localize the keystroke. In some example embodiments, $\Delta x$ is set to be 40 and $\Delta y$ is set to be 20 by default.

Multi-Thread Processing:

In an example embodiment, three threads are adopted to detect and localize the keystroke in parallel, i.e., a capturing thread for taking images, a tracking thread for detecting keystroke, and a localizing thread for localizing keystroke.

Processing without Writing and Reading Images:

In an example embodiment, the bytes of the source data are directly stored to a text file in a binary mode, instead of writing into or reading from an image file.

F. Performance Evaluation

Each component of example embodiments of the technology described herein is evaluated by inviting 9 users to test and compare the performance of these example embodiments with other text-entry methods. In these example embodiments, the technology described herein is implemented on a Samsung GT-I9100 smartphone running Google's Android operating system (version 4.4.4). However, the technology described herein can also be implemented on other operating systems. In these example embodiments, the layout of Apple Wireless Keyboard (AWK) is used as a default keyboard layout, which is printed on a piece of US Letter sized paper. In these example embodiments, frame rate is set to be 15 fps, image size is set to be 480*460 pixels. Of course, the frame rate and image size may also be other values.

1) Localization Accuracy for Known Keystrokes

Figure 9:
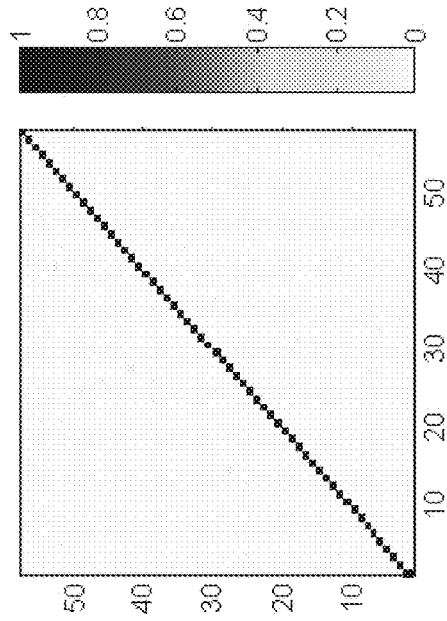
FIG. 9 shows a result of keystroke localization in accordance with a non-limiting example embodiment.

In order to verify the optimal parameters for image processing have been obtained, the accuracy of keystroke localization is measured when there are known keystrokes. During an accuracy measurement process, a user presses the 59 keys (excluding the PC function keys: first row, five keys in last row) on a paper keyboard sequentially, and each key is pressed fifty times. FIG. 9 shows an illustrative example result of keystroke localization, in which the localization accuracy is close to 100%. It means that the example embodiments of the technology described herein can adaptively select appropriate values of the parameters used for image processing.

2) The Accuracy of Keystroke Localization and the False Positive Rate of Keystroke Detection As discussed above, the keystroke detection and localization processes are correlated with each other. In order to verify whether these example embodiments can utilize the features of a keystroke and online calibration for keystroke detection and localization, the accuracy of keystroke localization and the false positive rate of keystroke detection are measured during a typing process. These example experiments are conducted in three typical scenarios: an office, a coffee shop, and an outdoor environment. Usually, in offices, the color of light is close to white. In coffee shops, the color of red lights is similar to that of human skin. In outdoor environments, sunlight is considered to be basic and pure. In an example test, a user randomly makes $N_k$ to be 500 keystrokes. Assuming $N_a$ keystrokes are localized correctly and $N_f$ non-keystrokes are incorrectly treated as keystrokes, the accuracy is $$p_a = \frac{N_a}{N_k},$$

and the false positive probability is $$p_f = \frac{N_f}{N_k}.$$

Figure 10:
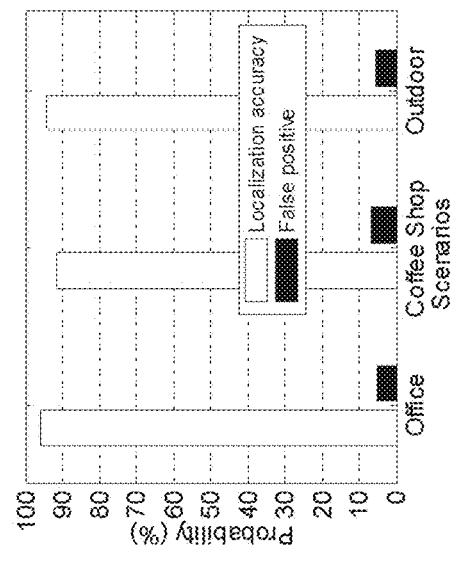
FIG. 10 shows the result of three illustrative example experiments conducted in three example scenarios: an office, a coffee shop, and an outdoor environment.

FIG. 10 illustrates example results of these example experiments, which indicates that the example embodiments can achieve high accuracy (at least larger than 90%) and a low false positive rate (about 5%). In offices, the localization accuracy can be as high as 95%.

3) Frame Rate

Figure 11:
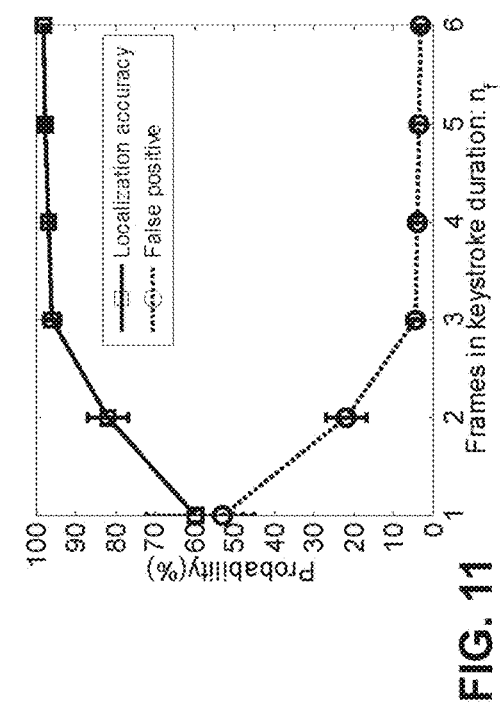
FIG. 11 shows the performance of keystroke detection and localization with respect to the total number of frames during a keystroke duration in accordance with a non-limiting example embodiment.

As discussed above, a frame rate affects the number of images $\bar{n}_f$ during a keystroke. Obviously, the larger the value of $\bar{n}_f$ is, the easier a keystroke can be detected and localized. On the contrary, when the value of $\bar{n}_f$ is small, keystrokes may be missed. FIG. 11 shows the performance of keystroke detection and localization with respect to the total number of frames during a keystroke duration in accordance with a non-limiting example embodiment. As shown in FIG. 11, when $\bar{n}_f \geq 3$, the performance of keystroke detection and localization is good. When $\bar{n}_f > 3$, there is no obvious improvement of the performance, in terms of keystroke localization accuracy or the false positive rate of keystroke detection. However, as $\bar{n}_f$ increases, more images are introduced for processing, and hence the time latency may increase. In preferred example embodiments, in considering accuracy, false positive, and time latency, $\bar{n}_f$ is set to be 3. In other example embodiments, $\bar{n}_f$ may also be set to be other values.

Figure 12:
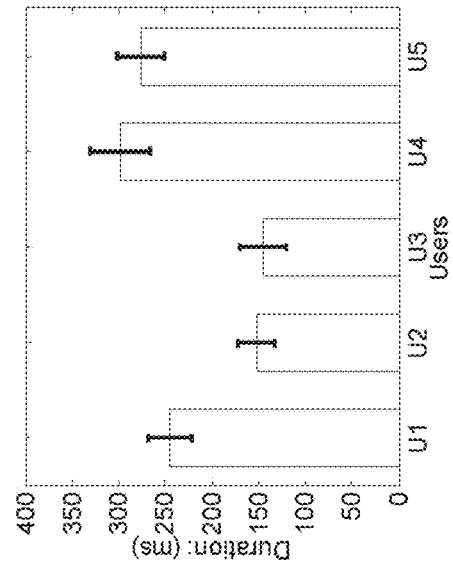
FIG. 12 shows non-limiting example durations of keystrokes.

In addition, at least 5 users are invited to test the duration $\Delta t$ of a keystroke. $\Delta t$ represents the period of time during which a StrokeTip is located at a StrokeKey from the prospective of a camera. FIG. 12 shows example durations of keystrokes, which illustrates that the duration for a keystroke $\Delta t$ is usually larger than 150 ms. When $\bar{n}_f=3$, the frame rate is less than the maximum frame rate (30 fps). Accordingly, $\bar{n}_f=3$ is an appropriate choice, and certain example embodiments of the technology described herein can work under the frame rate limitation of smartphones.

4) Impact of Image Size

Figure 14:
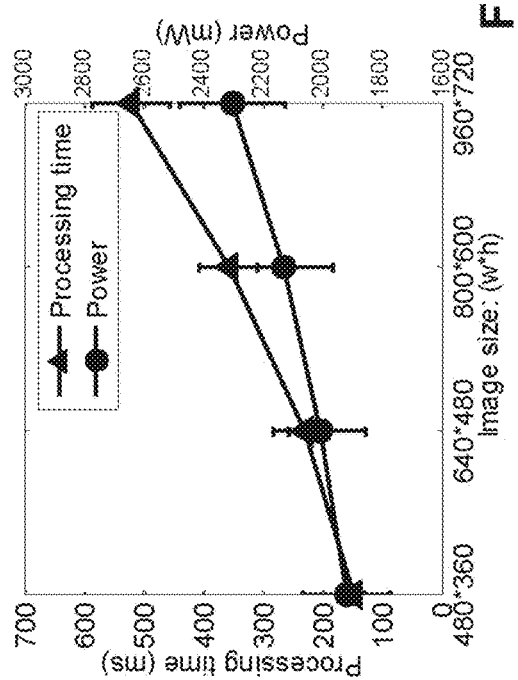
FIG. 14 shows changes in processing time/power of key detection and localization with respect to changes in image size in accordance with a non-limiting example embodiment.
Figure 13:
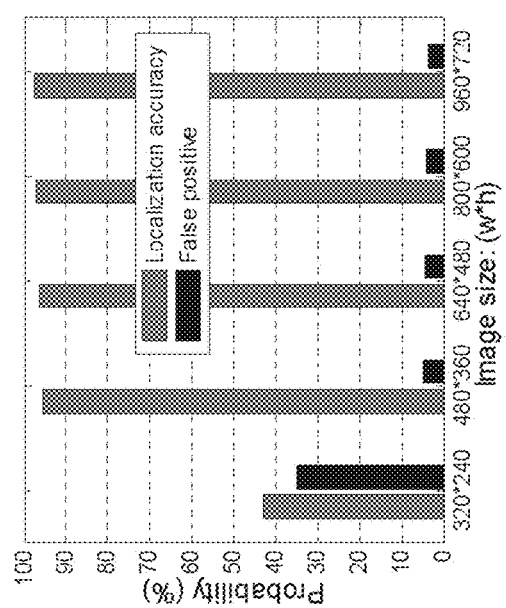
FIG. 13 shows changes in accuracy and false positive of key detection and localization with respect to changes in image size in accordance with a non-limiting example embodiment.

The performance of certain example embodiments is measured by adopting a same size for each image. FIG. 13 shows changes in accuracy and false positive of key detection and localization with respect to changes in image size in accordance with a non-limiting example embodiment. In FIG. 13, as the image size increases, the performance of these example embodiments becomes better. In particular, when the image size is smaller than 480*360 pixels, keys cannot be extracted correctly, and the performance is very bad. In contrast, when the image size is 480*360 pixels, the performance is good. Further increases in the image size do not cause any obvious improvement. In addition, FIG. 14 shows changes in processing time/power of key detection and localization with respect to changes in image size in accordance with a non-limiting example embodiment. As shown in FIG. 14, an increase in the image size will cause an increase in image processing time and power consumption (i.e., measured by a Monsoon power monitor, see "Monsoon power monitor," http://www.msoon.com/, 2015.)

As discussed above, in some example embodiments, image sizes may be changed adaptively. In order to guarantee high accuracy and low false positive rate, and to reduce time latency and power consumption, in preferred example embodiments, the size of a large image is set to be 480*380 pixels. However, a large image could be in other sizes, as well.

Figure 16:
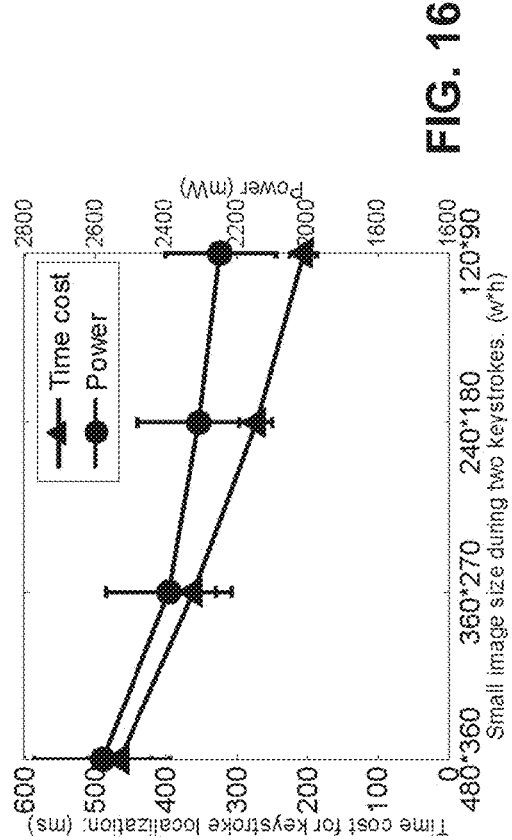
FIG. 16 shows changes in processing time/power for key detection and localization with respect to changes in image size in accordance with a non-limiting example embodiment.
Figure 15:
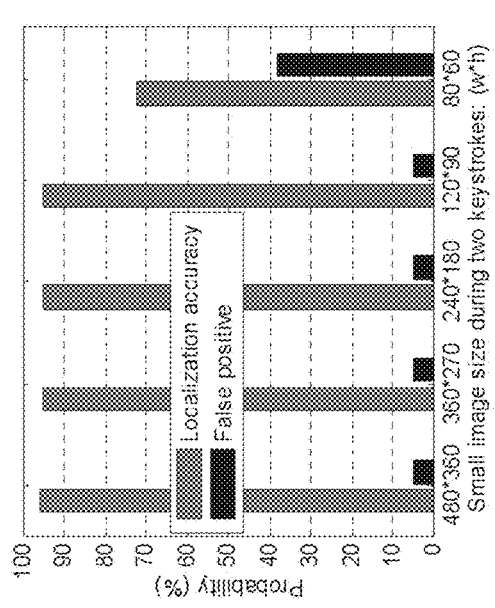
FIG. 15 shows changes in accuracy and false positive for key detection and localization with respect to changes in image size in accordance with a non-limiting example embodiment.

FIG. 15 shows changes in accuracy and false positive for key detection and localization with respect to changes in image size in accordance with a non-limiting example embodiment. As shown in FIG. 15, in the example embodiment, when the size of small images decreases from 480*360 pixels to 120*90 pixels, it still keeps high accuracy and low false positive. In the example embodiment, when the size of small images continues decreasing, the accuracy decreases a lot, and the false positive rate increases a lot. In addition, FIG. 16 shows changes in processing time/power for key detection and localization with respect to changes in image size in accordance with a non-limiting example embodiment. In the example embodiment, as image size decreases, the time cost/power consumption for keystroke localization keeps decreasing, as shown in FIG. 16. In view of FIG. 15 and FIG. 16, in preferred example embodiments, the size of small images is set to be 120*90 pixels. However, small images may also be in other sizes.

5) Time Latency and Power Consumption

FIG. 16 shows that, in an example embodiment, the time cost for locating a keystroke is about 200 ms, which is comparable to the duration of a keystroke, as shown in FIG. 12. In other words, when the user stays in a pressed key, text can be outputted without any noticeable time latency. In fact, in certain example embodiments, the time latency is within 50 ms or even smaller, which is well below human response time. In addition, the power consumption of a Samsung GT-I9100 smartphone is measured in four different states: (1) idle with its screen on; (2) writing an email; (3) keeping its camera on a preview mode (i.e., frame rate is 15 fps); (4) running an example embodiment of the technology described herein (i.e., frame rate is 15 fps). The power consumptions at these four states are 516 mW, 1189 mW, 1872 mW, and 2245 mW respectively. Therefore, the power consumption of some example embodiments of the technology described herein is relatively high, but still acceptable. In other example embodiments, the energy cost may be further reduced.

6) User Study

In order to evaluate the usability of an example embodiment of the technology described herein, 9 users were invited to test the embodiment in different environments. An input speed and an error rate $p_e=(1-p_a)+p_f$ are used as metrics. Each user tested the example embodiment by typing both regular text sentences and random characters. A camera-based paper keyboard of the embodiment is compared with other three input methods: an IBM style PC keyboard, Google's Android on-screen keyboard, and a Swype keyboard. In particular, the Swype keyboard allows a user to slide a finger across keys and then use the language mode to guess the word.

Figure 17:
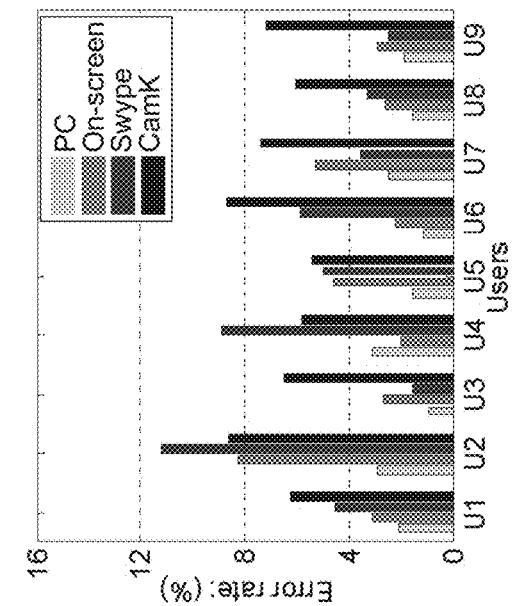
FIG. 17 shows illustrative example input speeds for inputting regular text via various means.
Figure 18:
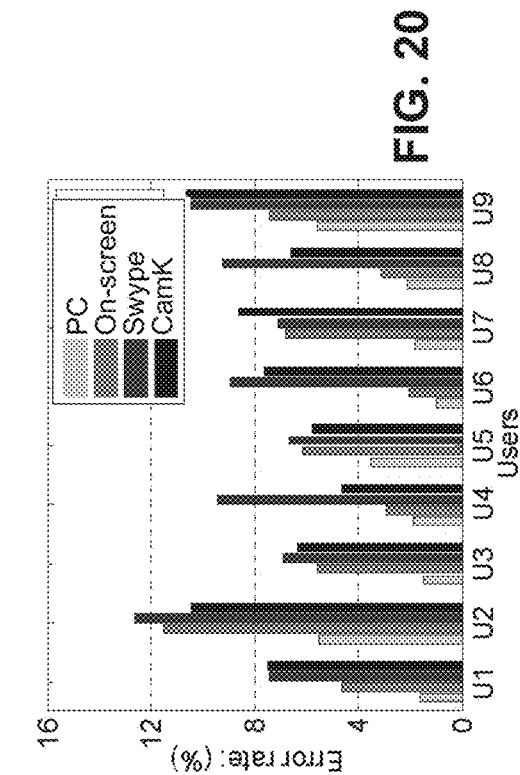
FIG. 18 shows illustrative example error rates for inputting regular text via various means.

Regular Text Input:

FIG. 17 shows illustrative example input speeds while inputting regular text via various means. Each user achieved the highest input speed when he/she was using an IBM style PC keyboard, as users can locate the keys on the physical keyboard by touch, while they tend to look at a paper keyboard to find a key. The paper keyboard can achieve 1.25× typing speedup, compared to an on-screen keyboard. By the paper keyboard, users can type 1.5-2.5 characters per second. As the UbiK requires users to type with their finger nails (which is not typical), the paper keyboard improves the input speed by about 20%. FIG. 18 shows the illustrative example error rates while inputting regular text via various means. Although the example camera-based keyboard caused relatively more errors than other methods, as a new technique, its error rate is still tolerable. In certain example embodiments, the error rate of a camera-based keyboard is 5%-9%, which is comparable to that of the UbiK (about 4%-8%).

Figure 19:
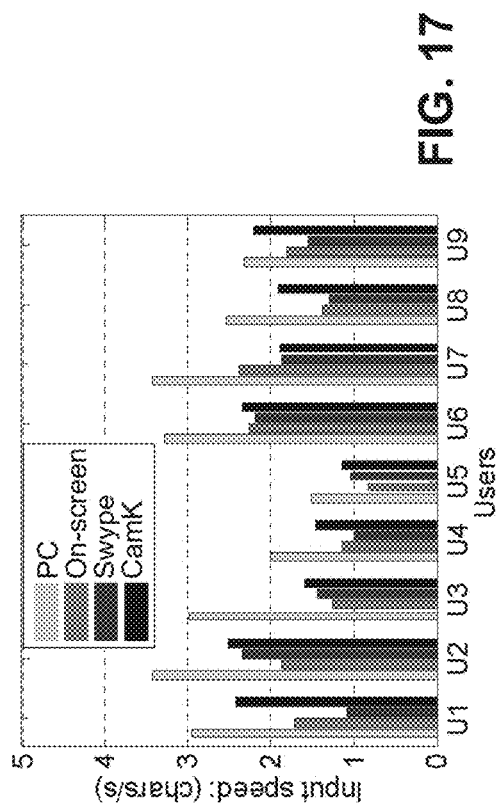
FIG. 19 shows illustrative example input speeds while inputting random characters via various means.
Figure 20:
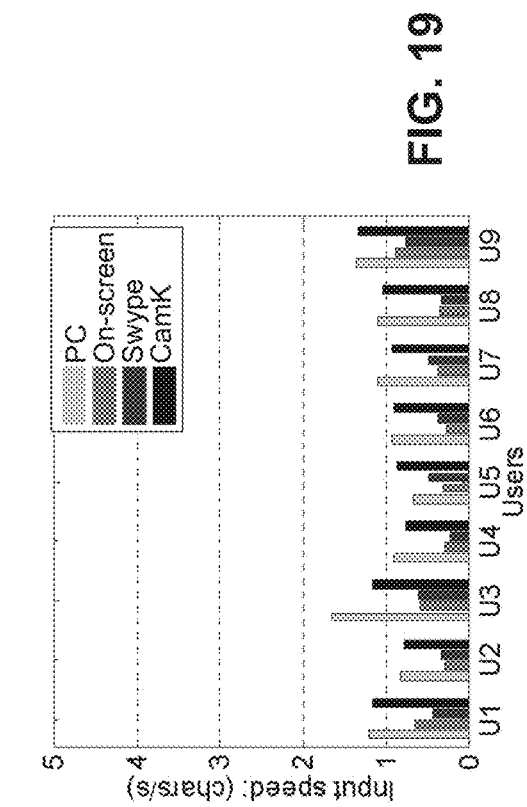
FIG. 20 shows illustrative example error rates while inputting random characters via various means.

Random Character Input:

FIG. 19 shows the illustrative example input speeds while inputting random characters via various means. For example, the random characters may include a lot of digits and punctuations. While users are inputting random characters, instead of the regular text, the input speed of the example camera-based keyboard decreases. However, the input speed of the example camera-based keyboard now is comparable to that of the PC keyboard, as users always tend to look at the keyboard to find these less commonly-typed characters regardless the type of the keyboard. Typing speed on the example camera-based keyboard can be 2.5× faster than the on-screen keyboard and the Swype keyboard, as the on-screen and Swype keyboard need to switch between different screens to find the combination of letters, digits, and punctuations. On the other hand, when users input random characters, typing on the UbiK keyboard can be 2× faster than the on-screen keyboard. Therefore, the example camera-based keyboard can improve more input speed than the UbiK. In addition, FIG. 20 shows the illustrative example error rates while inputting random characters via various means. Due to the randomness of the characters, the error rate increases, especially for typing with the on-screen keyboard and Swype keyboard, due to switching between different screens. However, the error rate of the example camera-based keyboard does not increase that much, because users can input these characters just like they use the PC keyboard. The error rate of the example camera-based keyboard (i.e., around 6%-10%) is comparable to that of the UbiK keyboard (4%-10%).

By using image processing technology, example embodiments of the technology described herein have nearly 96% accuracy for keystroke localization and a false positive rate as low as 4.8% for keystroke detection. As these example embodiments allow users to use ten fingers in typing, users' typing speeds are improved by 25% for regular text input and by 1.5 times for random character input.

The example embodiments described herein focus on outputting each pressed key accurately and timely based on image processing results. In other example embodiments, error correction and word prediction scheme may also be incorporated to further improve the performance of camera-based keyboards.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An input system allowing a user to interact with a mobile device via a keyboard including a plurality of keys, comprising:
   a processor system including at last one processor, the processor system being configured to at least:
   capture a plurality of images in connection with the keyboard and/or at least one hand typing on the keyboard via a camera, locate the keyboard based on at least one of the plurality of images that is captured while the keyboard is not being typed on by the user;

extract at least a portion of the keys on the located keyboard based on at least one of the plurality of captured images;

extract a hand based on at least one of the plurality of captured images;

detect a fingertip of the extracted hand based on at least one of the plurality of captured images;

detect and localize a keystroke through tracking the detected fingertip based on at least one of the plurality of captured images; and determine a character corresponding to the localized keystroke.

2. The input system according to claim 1, wherein the interaction between the user and the mobile device is inputting text into the mobile device.

3. The input system according to claim 1, wherein the keyboard is printed on a piece of panel.

4. The input system according to claim 3, wherein the piece of panel is a piece of paper.

5. The input system according to claim 1, wherein the camera is embedded within the mobile device.

6. The input system according to claim 1, wherein the processor system is further configured to use edge detection techniques in locating the keyboard.

7. The input system according to claim 1, wherein the processor system is further configured to use color segmentation techniques to extract the portion of keys on the keyboard.

8. The input system according to claim 1, wherein the processor system is further configured to localize the portion of keys on the keyboard based on the location of a predetermined key.

9. The input system according to claim 1, wherein Otsu's method and/or skin segmentation techniques are used to extract the hand.

10. The input system according to claim 1, wherein erosion and/or dilation operations are used while extracting the hand.

11. The input system according to claim 1, wherein the fingertip is detected based on whether its corresponding finger has the largest vertical coordinate.

12. The input system according to claim 1, wherein the processor system is further configured to select candidate keys around the keystroke in detecting and localizing the keystroke.

13. The input system according to claim 12, wherein the processor system is further configured to keep only a portion of the selected candidate keys that contain one of the detected fingertip, in detecting and localizing the keystroke.

14. The input system according to claim 12, wherein the keystroke is localized based on visually obstructed areas of the selected candidate keys.

15. The input system according to claim 1, wherein the processor system is further configured to select the detected fingertip as a StrokeTip based on a vertical distance between the detected fingertip and the remaining fingertips of the same hand, in detecting and localizing the keystroke.

16. The input system according to claim 1, wherein the processor system is further configured to use online calibration techniques to utilize movement features of the detected fingertip to remove a false positive keystroke.

17. The input system according to claim 1, wherein the plurality of images are captured by the camera at a predetermined frame rate.

18. The input system according to claim 1, wherein the processor system is further configured to re-locate the keyboard due to the movement of the keyboard or the mobile device.

19. The input system according to claim 1, wherein the processor system is further configured to adaptively change the sizes of at least one of the plurality of captured images.

20. The input system according to claim 1, wherein the keystroke is localized through focusing on a partial area of one of the plurality of captured images.

21. The input system according to claim 1, wherein the detection and localization of the keystroke is performed by multiple threads.

22. The input system according to claim 1, wherein source image data of the plurality of captured images are directly stored to a text file in a binary mode.

23. A method for allowing a user to interact with a mobile device via a keyboard including a plurality of keys, comprising:

capturing a plurality of images in connection with a keyboard and/or at least one hand typing on the keyboard via a camera, locating the keyboard based on at least one of the plurality of images that is captured while the keyboard is not being typed on by the user;

extracting at least a portion of the keys on the located keyboard based on at least one of the plurality of captured images;

extracting a hand based on at least one of the plurality of captured images;

detecting a fingertip of the extracted hand based on at least one of the plurality of captured images;

detecting and localizing a keystroke through tracking the detected fingertip based on at least one of the plurality of captured images; and determining a character corresponding to the localized keystroke.

24. A non-transitory computer-readable storage medium storing a text-entry program, the text entry program being executable by a processor system including at least one processor, wherein the text entry program allows the processor system to execute:

capturing a plurality of images in connection with a keyboard and/or at least one hand typing on the keyboard via a camera, locating the keyboard based on at least one of the plurality of images that is captured while the keyboard is not being typed on by a user;

extracting at least a portion of keys on the located keyboard based on at least one of the plurality of captured images;

extracting a hand based on at least one of the plurality of captured images;

detecting a fingertip of the extracted hand based on at least one of the plurality of captured images;

detecting and localizing a keystroke through tracking the detected fingertip based on at least one of the plurality of captured images; and determining a character corresponding to the localized keystroke.

* * * * *